United States Patent
Oh et al.

(10) Patent No.: US 12,227,079 B2
(45) Date of Patent: *Feb. 18, 2025

(54) METHOD OF CONTROLLING TORQUE OF VEHICLE DRIVING DEVICE

(71) Applicants: Hyundai Motor Company, Seoul (KR); Kia Corporation, Seoul (KR)

(72) Inventors: Ji Won Oh, Gyeonggi-do (KR); Jeong Soo Eo, Gyeonggi-do (KR); Sung Jae Kim, Gyeonggi-do (KR); Lee Hyoung Cho, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 412 days.

This patent is subject to a terminal disclaimer.

(21) Appl. No.: 17/481,756

(22) Filed: Sep. 22, 2021

(65) Prior Publication Data
US 2022/0203843 A1  Jun. 30, 2022

(30) Foreign Application Priority Data
Dec. 31, 2020 (KR) ................. 10-2020-0189472

(51) Int. Cl.
*B60L 15/20* (2006.01)
*B60W 50/00* (2006.01)
(Continued)

(52) U.S. Cl.
CPC ............. *B60L 15/20* (2013.01); *B60W 50/06* (2013.01); *H02P 23/0004* (2013.01);
(Continued)

(58) Field of Classification Search
CPC ............. B60L 15/20; B60L 2240/421; B60L 2240/423; B60L 2240/12; H02P 23/0004;
(Continued)

(56) References Cited

U.S. PATENT DOCUMENTS

| 6,067,801 A * | 5/2000 | Harada .................. B60L 50/16 903/910 |
| 9,150,117 B2 | 10/2015 | Itou |
| 9,950,639 B2 * | 4/2018 | Vovos ..................... B60L 50/62 |
| 11,745,723 B2 * | 9/2023 | Oh ...................... B60W 30/188 701/22 |
| 2007/0101965 A1 * | 5/2007 | Asahara ................. F02D 35/024 477/3 |

(Continued)

FOREIGN PATENT DOCUMENTS

| CN | 108189705 A | 6/2018 |
| KR | 2014-0049638 A | 4/2014 |
| KR | 101704243 B1 | 2/2017 |

OTHER PUBLICATIONS

European Search Report from Corresponding European Application No. 21199791 dated Apr. 4, 2022, 10 pages.

*Primary Examiner* — Ian Jen
*Assistant Examiner* — Karston G. Evans
(74) *Attorney, Agent, or Firm* — Fox Rothschild LLP

(57) ABSTRACT method of controlling torque of a vehicle driving device is provided. The method includes estimating speed of a driving system of a vehicle from vehicle driving information collected from the vehicle and calculating speed difference between actually measured speed of the driving system and the estimated speed of the driving system. A nominal rate limit value is determined according to the vehicle driving information and a required real-time rate correction amount is determined according to the calculated speed difference. A torque command variation is determined based on the determined nominal rate limit value and the determined required real-time rate correction amount. A torque command after correction in a previous control period is corrected by the determined torque command variation to determine a torque command after correction in a current control period.

20 Claims, 15 Drawing Sheets

(51) Int. Cl.
*B60W 50/06* (2006.01)
*H02P 23/00* (2016.01)
*B60K 31/02* (2006.01)

(52) U.S. Cl.
CPC ......... *B60K 31/02* (2013.01); *B60L 2240/421* (2013.01); *B60L 2240/423* (2013.01); *B60W 2050/0008* (2013.01); *B60W 2510/083* (2013.01); *B60W 2710/0672* (2013.01); *B60W 2710/083* (2013.01); *B60W 2710/085* (2013.01)

(58) Field of Classification Search
CPC .................. B60K 31/02; B60W 50/06; B60W 2050/0008; B60W 2510/083; B60W 2710/0672; B60W 2710/083; B60W 2710/085; B60W 30/20; B60W 2710/0666; B60W 10/08; B60W 2050/0002; B60W 2050/0012; B60W 2710/081
See application file for complete search history.

(56) References Cited

U.S. PATENT DOCUMENTS

| | | | |
|---|---|---|---|
| 2008/0249691 A1* | 10/2008 | Kawaguchi | E02F 9/123 701/50 |
| 2011/0238246 A1* | 9/2011 | Martini | B60W 30/1882 180/65.265 |
| 2012/0185119 A1* | 7/2012 | Abe | B60W 20/11 903/902 |
| 2013/0080012 A1* | 3/2013 | Kobayashi | B60W 20/15 701/70 |
| 2014/0288758 A1* | 9/2014 | Suzuki | B60L 15/2009 701/22 |
| 2015/0012160 A1* | 1/2015 | Tsutsumi | B60L 15/20 701/22 |
| 2018/0086208 A1* | 3/2018 | Hodgson | B60L 3/104 |
| 2018/0281778 A1* | 10/2018 | Zhang | B60W 20/40 |
| 2019/0366855 A1 | 12/2019 | Oh et al. | |
| 2021/0001730 A1* | 1/2021 | Shindo | B60L 15/2009 |
| 2021/0023944 A1* | 1/2021 | Ravichandran | B60K 23/0808 |
| 2023/0318501 A1* | 10/2023 | Yamamoto | H02P 23/12 701/22 |

* cited by examiner $R_{Lim\_os}$: OVERSHOOT PREVENTION RATE LIMIT VALUE

METHOD OF CONTROLLING TORQUE OF VEHICLE DRIVING DEVICE

CROSS-REFERENCE TO RELATED APPLICATION

This application claims, under 35 U.S.C. § 119(a), the benefit of priority to Korean Patent Application No. 10-2020-0189472 filed on Dec. 31, 2020, the entire contents of which are incorporated herein by reference.

BACKGROUND

(a) Technical Field

The present disclosure relates to a method of controlling torque of a vehicle driving device, and more particularly to a method of controlling torque of a vehicle driving device capable of reducing man hour necessary to develop a controller configured to generate and adjust the torque of the vehicle driving device and adjusting a torque variation depending on circumferences.

(b) Background Art

A driving system of a vehicle must generate corresponding driving force based on a driver's driving input value through an accelerator pedal or a brake pedal or an input value of a torque command due to an advanced driver assistance system (ADAS). At this time, a change in the driving force may be needed. When the driving force is set to be excessively rapidly changed, a blowing problem due to twisting of a drive shaft or gear backlash or a drivability reduction problem caused by impact due to suddenly changed torque may occur.

When a variation of the driving force is excessively limited, on the other hand, excessive time may be taken until driving force required by the driver or the ADAS is generated. As a result, the behavior of the vehicle may be different from driver's intention. In addition, a slow reactivity problem may occur, and a dangerous situation in which it is not possible to cope with emergency of the vehicle may occur. A degree of reduction in noise, vibration, and harshness generated due to a sudden change in the driving force and a degree of securing vehicle acceleration and deceleration reactivity conflict with each other.

At present, a rate limit having various conditions as factors and a filter are used in the vehicle in order to generate the optimum torque command for a driving device (an engine or a driving motor) capable of solving such a conflict relationship. In addition, for an electrified vehicle using a motor as a driving source or a portion of the vehicle, a controller capable of performing active feedback torque correction control to inhibit vibration that has already been generated using the motor is used. To develop such a controller, however, excessive development man hour is required.

Furthermore, a problem that can occur in the case in which a post torque correction scheme is adopted is that, in the case in which the correction amount of torque is excessive, vibration divergence may occur. To prevent such a torque signal divergence phenomenon after correction, a differentiated strategy of setting the vibration amount for each situation is necessary. Since the number of calibrations to be adjusted for each situation is increased as the result thereof, however, development man hour is increased.

All conventional torque correction methods are post torque correction methods, and a calibration setting strategy for preventing torque signal divergence after correction is not known.

The above information disclosed in this section is provided merely for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide a method of controlling torque of a vehicle driving device capable of enabling a controller of a vehicle to autonomously control a torque command rate of the driving device, whereby it is possible to reduce excessive development man hour necessary to develop a controller configured to generate and control torque, to set a torque variation specialized depending on circumferences, and at the same time to remove danger of torque signal divergence.

The objects of the present disclosure are not limited to those described above, and other unmentioned objects of the present disclosure will be clearly understood by a person of ordinary skill in the art (hereinafter referred to as an "ordinary skilled person") from the following description.

In order to accomplish the object, in an aspect, the present disclosure provides a method of controlling torque of a vehicle driving device, the method including estimating, by a controller, speed of a driving system of a vehicle from vehicle driving information collected from the vehicle and calculating speed difference between actually measured speed of the driving system and the estimated speed of the driving system, determining, by the controller, a nominal rate limit value according to the vehicle driving information, determining, by the controller, a required real-time rate correction amount according to the calculated speed difference, determining, by the controller, a torque command variation based on the determined nominal rate limit value and the determined required real-time rate correction amount, and correcting, by the controller, a torque command after correction in a previous control period by the determined torque command variation to determine a torque command after correction in a current control period.

The determining of a torque command variation may include determining a rate after correction using the determined torque command variation and the determined required real-time rate correction amount, determining an overshoot prevention rate limit value, which is a difference value between a torque command before correction in a current control period determined from the vehicle driving information and a torque command after correction in a previous control period, and determining a torque command variation based on the determined rate after correction and the determined overshoot prevention rate limit value.

The overshoot prevention rate limit value may be determined to be a value obtained by subtracting the torque command after correction in the previous control period from the torque command before correction in the current control period. When the overshoot prevention rate limit value is determined to be a positive (+) value and the nominal rate limit value is determined to be a positive (+) value, a value obtained by summing the nominal rate limit value and the required real-time rate correction amount may be determined to be a rate after correction, and a smaller one of the rate after correction and the overshoot prevention rate limit value may be determined to be a torque command variation.

In addition, when the overshoot prevention rate limit value is determined to be a positive (+) value and the nominal rate limit value is determined to be a positive (+) value, a value obtained by summing the nominal rate limit value and the required real-time rate correction amount may be determined to be a rate after correction, and a minimum one of the rate after correction, the nominal rate limit value, and the overshoot prevention rate limit value may be determined to be a torque command variation.

When the overshoot prevention rate limit value is determined to be a negative (−) value and the nominal rate limit value is determined to be a positive (+) value, the nominal rate limit value may be multiplied by −1 to change the nominal rate limit value to a negative (−) value, a value obtained by summing the nominal rate limit value changed to the negative (−) value and the required real-time rate correction amount may be determined to be a rate after correction, and a larger one of the rate after correction and the overshoot prevention rate limit value may be determined to be a torque command variation.

In addition, when the overshoot prevention rate limit value is determined to be a negative (−) value and the nominal rate limit value is determined to be a positive (+) value, the nominal rate limit value may be multiplied by −1 to change the nominal rate limit value to a negative (−) value, a value obtained by summing the nominal rate limit value changed to the negative (−) value and the required real-time rate correction amount may be determined to be a rate after correction, and a maximum one of the rate after correction, the nominal rate limit value changed to the negative (−) value, and the overshoot prevention rate limit value may be determined to be a torque command variation.

Both the overshoot prevention rate limit value and the nominal rate limit value, each of which is one of a positive (+) value and a negative (−) value, may be determined to be the same positive (+) or negative (−) values, and a value obtained by summing the nominal rate limit value and the required real-time rate correction amount may be determined to be a rate after correction. When the overshoot prevention rate limit value is a positive (+) value, a smaller one of the rate after correction and the overshoot prevention rate limit value may be determined to be a torque command variation, and when the overshoot prevention rate limit value is a negative (−) value, a larger one of the rate after correction and the overshoot prevention rate limit value may be determined to be a torque command variation.

The overshoot prevention rate limit value and the nominal rate limit value may be determined to be values having opposite signs, each of which is one of a positive (+) value and a negative (−) value, the nominal rate limit value may be multiplied by −1 to reverse the sign of the nominal rate limit value, and a value obtained by summing the nominal rate limit value having the changed sign and the required real-time rate correction amount may be determined to be a rate after correction.

The determining of a rate after correction may include determining a rate obtained by correcting the determined nominal rate limit value by the required real-time rate correction amount and determining the rate after correction obtained by limiting the rate corrected by the required real-time rate correction amount based on a reverse rate limit value. When both the overshoot prevention rate limit value and the reverse rate limit value, each of which is one of a positive (+) value and a negative (−) value, are the same positive (+) or negative (−) values, the reverse rate limit value may be multiplied by −1 to reverse the sign of the reverse rate limit value, and the reverse rate limit value having the changed sign may be used in limiting the rate corrected by the required real-time rate correction amount.

The determining of a rate after correction may include determining a rate obtained by correcting the determined nominal rate limit value by the required real-time rate correction amount and determining the rate after correction obtained by limiting the rate corrected by the required real-time rate correction amount to a value between the set maximum rate limit value and the set minimum rate limit value.

When the overshoot prevention rate limit value and the maximum rate limit value are values having opposite signs, each of which is one of a positive (+) value and a negative (−) value, the maximum rate limit value may be multiplied by −1 to reverse the sign of the maximum rate limit value, when both the overshoot prevention rate limit value and the minimum rate limit value are values having same signs, each of which is one of a positive (+) value and a negative (−) value, the minimum rate limit value may be multiplied by −1 to reverse the sign of the minimum rate limit value, and the rate after correction limited to a value between the maximum rate limit value having the changed sign and the minimum rate limit value having the changed sign may be determined.

The estimating of the speed of the driving system of the vehicle from the collected vehicle driving information in the step of calculating speed difference may include outputting, by a feedback calculation unit of the controller, a feedback control value using speed difference between current measured speed of the driving system and estimated speed in a previous control period as input, determining and outputting, by a feedforward calculation unit of the controller, driving system torque from the vehicle driving information, summing the output value of the feedback calculation unit and the output value of the feedforward calculation unit and converting a sum value into driving system angular acceleration using an inertia correction coefficient, and obtaining estimated speed of the driving system from driving system angular speed obtained by integrating the converted driving system angular acceleration and rate information of a reference torque command.

The feedback calculation unit may include a P controller and an I controller each having the speed difference between the current measured speed of the driving system and the estimated speed in the previous control period as input and a first summation unit configured to sum an output value of the P controller and an output value of the I controller and to output a sum value as the feedback control value.

The feedforward calculation unit may include an acceleration model unit configured to apply a correction coefficient to the reference torque command, which is a driving torque command, to determine and output a driving torque value, a braking model unit configured to apply a correction coefficient to a braking torque command to determine and output a braking torque value, and a second summation unit configured to sum an output value of the acceleration model unit and an output value of the braking model unit and to output a sum value as the driving system torque.

In the obtaining of the estimated speed of the driving system, a variation of the reference torque command may be corrected by a correction coefficient and may be summed with the driving system angular speed to obtain the estimated speed of the driving system.

BRIEF DESCRIPTION OF THE DRAWINGS

The above and other features of the present disclosure will now be described in detail with reference certain exemplary embodiments thereof illustrated in the accompanying drawings which are given hereinbelow by way of illustration only, and thus are not limitative of the present disclosure, and wherein.

Figure 1:
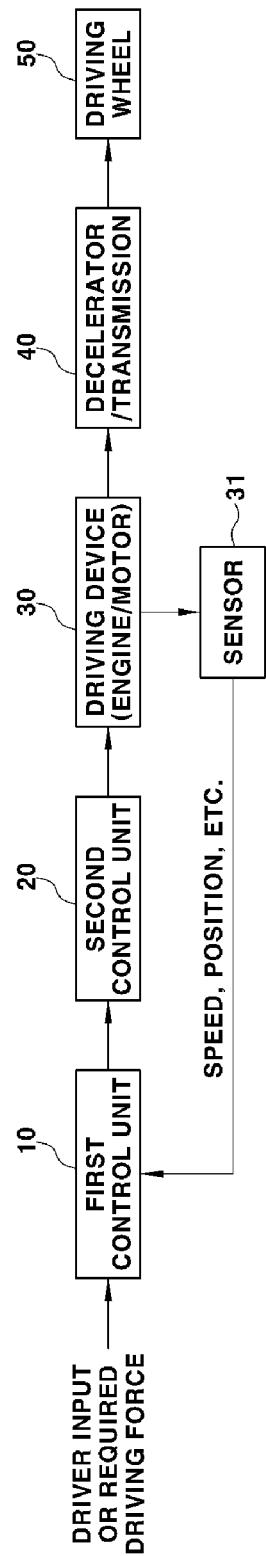
FIG. 1 is a block diagram showing the construction of an apparatus for performing a torque control process according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Specific structural or functional descriptions of the embodiments of the present disclosure disclosed in this specification are given only for illustrating embodiments of the present disclosure. Embodiments of the present disclosure may be realized in various forms. In addition, the exemplary embodiments according to the concept of the present disclosure are not limited all alterations, equivalents, and substitutes that fall within the idea and technical scope of the present disclosure.

It will be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

Wherever possible, the same reference numbers will be used throughout the drawings to refer to the same or like parts. The terms used in this specification are provided only to explain specific embodiments, but are not intended to restrict the present disclosure. A singular representation may include a plural representation unless it represents a definitely different meaning from the context. It will be further understood that the terms "comprises", "comprising" and the like, when used in this specification, specify the presence of stated components, steps, operations, and/or elements, but do not preclude the presence or addition of one or more other components, steps, operations, and/or elements.

Hereinafter, exemplary embodiments of the present disclosure will be described in detail with reference to the accompanying drawings.

The present disclosure relates to a method of controlling torque of a vehicle driving device, and more particularly to a method of adjusting a torque variation (or a torque rate) of a vehicle driving device depending on vehicle driving conditions. In an actual vehicle control process, a controller may be configured to generate a torque command to control torque of the driving device. Consequently, adjustment of torque of the driving device and adjustment of a torque variation thereof may refer to determination of a torque command and adjustment of a torque command variation (or a torque command rate) from a viewpoint of control. In the present disclosure, the torque command variation may be adjusted based on vehicle driving conditions, and the torque command rate is corrected in order to adjust the torque command variation.

The control method according to the present disclosure is applicable to an electrified vehicle using a motor as a vehicle driving source. In other words, the control method according to the present disclosure is applicable to a pure electric vehicle configured to drive using a motor, a fuel cell vehicle, or a hybrid vehicle configured to drive using both a motor and an engine (an internal combustion engine).

In the present disclosure, a difference value between actual speed (measured speed) of a driving system of the vehicle and reference speed (estimated speed) of the driving system with factors, such as twisting and backlash, removed is calculated, and a torque variation (or a torque rate, which is a rate of change) is adjusted or limited using a function of the difference value. Particularly, the driving system of the vehicle includes a motor or includes a motor and an engine, and the speed of the driving system may be motor speed or engine speed.

Various methods of calculating the actual speed and the reference speed of the driving system and the difference value therebetween are known. In a general method, estimated speed (reference speed or model speed) of the motor converted from wheel speed in consideration of a gear ratio is compared with actual speed (measured speed) of the motor to obtain a difference value therebetween. In other words, a speed difference value based on "actual speed of motor—wheel speed x effective gear ratio" is calculated so as to be used in correcting torque (correcting a torque command). The actual speed of the motor and the wheel speed are actual values detected by sensors.

In addition, the present disclosure proposes a method of collectively using a nominal-value-based method and a real-time-backlash-feedback-based method to correct a torque command as a method of limiting a torque rate. In particular, a known method may be used as a method of calculating a speed difference value (a value corresponding to backlash) for real-time feedback driving.

The nominal value is a value preset by a map or a function based on speed and torque of the motor. The nominal-value-based torque correction method uses a nominal rate limit value, as will be described below. In this method, there is no danger of signal divergence and reactivity is fast. However, it is difficult to perform behavior optimized for each situation in real time. In the real-time-backlash-feedback-based torque correction method, on the other hand, it is possible to perform behavior optimized for each situation, but it is difficult to secure initial reactivity. Consequently, the present disclosure discloses a new torque correction method capable of achieving all advantages of the torque correction methods in consideration of characteristics described above.

In the present disclosure, torque refers to torque of a driving device configured to drive a vehicle, such as torque of a motor or torque of an engine and torque of a motor. In addition, torque means a torque command from a viewpoint of control. Further, in the present disclosure, torque of the driving device may encompass driving torque, which is torque in a driving direction (a positive (+) direction), and regenerative torque, which is torque in the reverse direction (a negative (1) direction).

In addition, a torque variation may be a rate at which torque is changed, and the torque variation and the torque rate may refer to a torque command variation and a torque command rate. In the present disclosure, the torque rate is limited in simultaneous consideration of the map-based (nominal-value-based) method and the real-time-feedback-based method.

FIG. 1 is a block diagram showing the construction of an in-vehicle apparatus for performing a torque control process according to the present disclosure. Referring to FIG. 1, the apparatus for performing the torque control process may include a first controller 10 configured to determine and generate a torque command from vehicle driving information collected from the vehicle, a second controller 20 configured to receive the torque command output from the first controller 10 and to operate a driving device 30, and the driving device 30 being a vehicle driving source, operation of the driving device 30 being controlled by the second controller 20.

In a general electrified vehicle, the torque command is determined and generated based on vehicle driving information collected during driving. In particular, the vehicle driving information may be sensor detection information detected by a sensor 31 and input to the first controller 10 over a vehicle network. The sensor 31 may be a sensor configured to detect speed of the driving device. For example, the sensor 31 may be an engine RPM sensor configured to detect rotational speed of an engine (engine speed) or a sensor configured to detect rotational speed of a motor (motor speed).

A resolver configured to detect the position of a rotor of the motor may be used as the sensor configured to detect the rotational speed of the motor. In addition, the sensor may be a sensor configured to detect driving system speed. Particularly, the driving system speed may be rotational speed of a part at an arbitrary position between the driving device 30 and a driving wheel 50. For example, the driving system speed may be not only engine speed or motor speed but also rotational speed of a drive shaft, rotational speed of a transmission or a decelerator 40 at input and output positions thereof, or rotational speed of the driving wheel 50.

Alternatively, the vehicle driving information may be information determined by the first controller 10 or information (e.g. required torque information) input to the controller of the present disclosure from another controller (e.g.

an ADAS controller) in the vehicle over the vehicle network. The first controller 10 may be a vehicle controller (VCU) or a hybrid controller (HCU) configured to generate a torque command based on the vehicle driving information in the general electrified vehicle.

In the exemplary embodiment of the present disclosure, the first controller 10 may be configured to determine a reference torque command from the vehicle driving information, and generate a final torque command using the determined reference torque command and speed difference (a difference value between measured speed and estimated speed), a description of which will follow. The final torque command may be transmitted from the first controller 10 to the second controller 20, and the second controller 20 may be configured to operate the driving device 30 according to the final torque command sent from the first controller 10.

An accelerator position sensor (APS) value of a driver, a brake pedal position sensor (BPS) value of the driver, driving system speed detected by the sensor, and vehicle speed detected by the sensor may be selectively used as the vehicle driving information for determining and generating the torque command. In the vehicle driving information, the accelerator position sensor value and the brake pedal position sensor value are driver input information, and the driving system speed and the vehicle speed detected by the sensor are vehicle driving state information.

The method and process of determining and generating the reference torque command (a torque command before correction, a description of which will follow) for operating the driving device in the electrified vehicle are known in the art to which the present disclosure pertains, and a detailed description thereof will be omitted. The second controller 20, which is a controller configured to operate the driving device 30, which is a vehicle driving source, based on the torque command (a corrected final torque command) generated by and output from the first controller 10, may include a known motor controller (MCU) configured to drive the motor, which is the driving device 30, and to operate the motor through an inverter according to the torque command in the general electrified vehicle. In addition, the second controller 20 may further include a known engine controller (ECU) configured to operate an engine, which is the driving device 30, according to the torque command in a hybrid vehicle.

In the following description, a control agent will be described as comprising a first controller and a second controller. However, the torque control process according to the present disclosure may be performed using a single integrated control element instead of a plurality of controllers. The plurality of controllers and the single integrated control element may be commonly referred to as a controller, and the torque control process according to the present disclosure, a description of which will follow, may be performed by the controller. For example, the controller may commonly refer to the first controller and the second controller.

Figure 2:
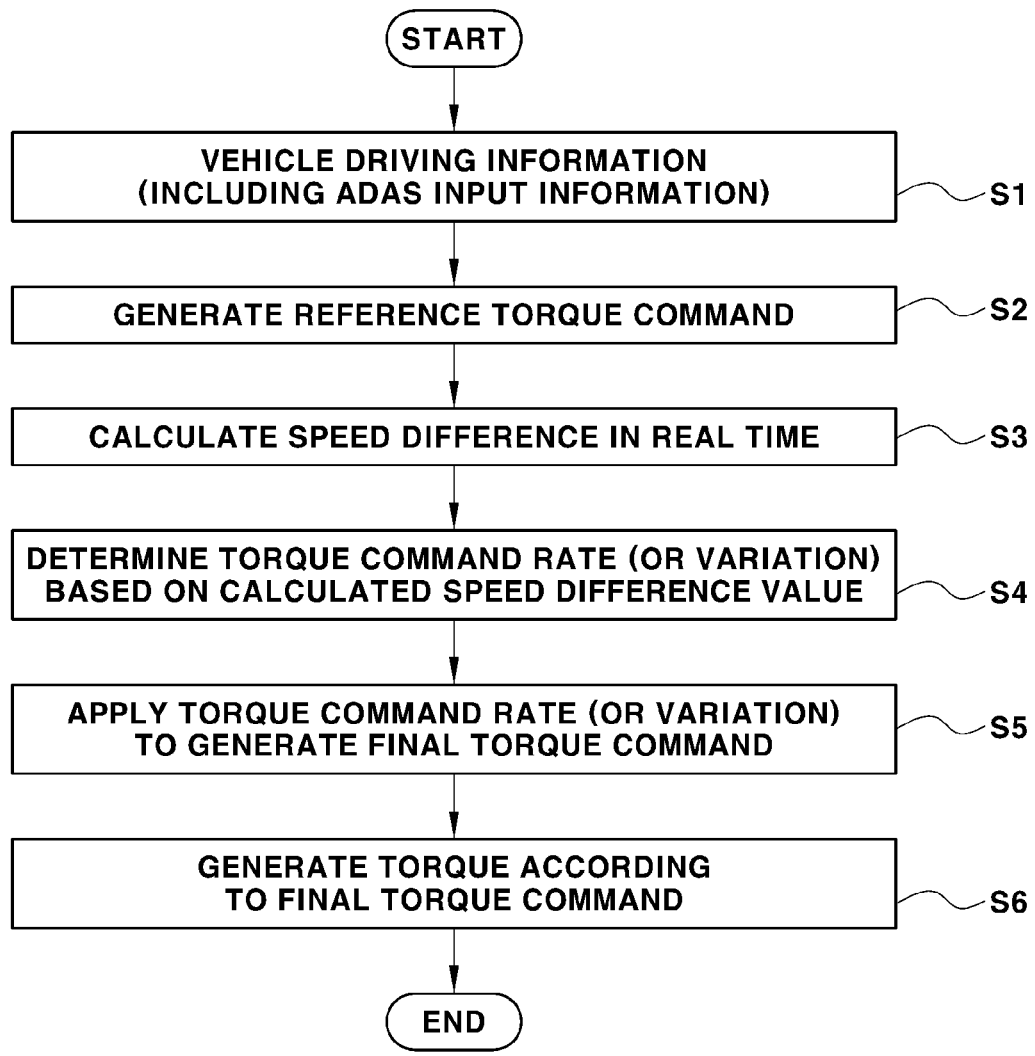
FIG. 2 is a flowchart showing a torque control process according to an exemplary embodiment of the present disclosure.

Meanwhile, FIG. 2 is a flowchart showing a torque control process according to an exemplary embodiment of the present disclosure. As shown, the process of controlling torque of the vehicle driving device according to the exemplary embodiment of the present disclosure may include a step (S1) of collecting, by the controller, vehicle driving information necessary to generate a torque command, a step (S2) of generating a reference torque command based on the vehicle driving information, a step (S3) of calculating a real-time speed difference value, a step (S4) of determining a torque command rate (or a torque command variation) using the calculated speed difference value and the reference torque command, and a step (S5) of applying the determined torque command rate (or the determined torque command variation) to determine a final torque command. This process may be performed by the first controller 10 configured to determine and generate the torque command. In response to determining the final torque command, as described above, a step S6 of operating, by the second controller 20, the driving device 30 according to the final torque command is performed.

In the process of adjusting torque of the vehicle driving device according to the exemplary embodiment of the present disclosure, a method of generating the final torque command through a rate (or a variation) limiting process using the calculated speed difference value, i.e. the speed difference, may be applied. First, a method of calculating a speed difference value (hereinafter referred to as "speed difference") will be described in detail.

Figure 3:
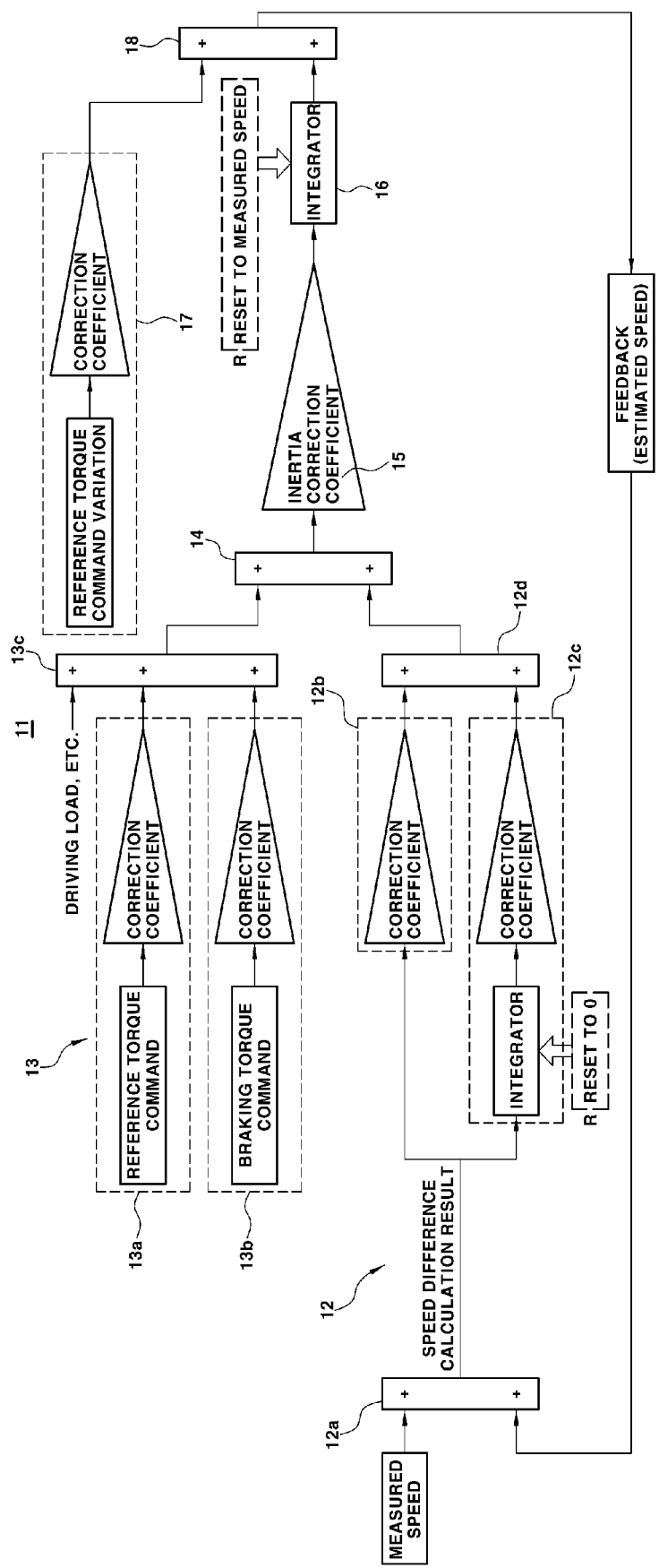
FIG. 3 is a view showing the construction of a speed difference calculation unit in a first controller configured to calculate speed difference in the embodiment of the present disclosure and a speed difference calculation method.

FIG. 3 is a view showing the construction of a speed difference calculation unit in the first controller 10 configured to calculate speed difference in the exemplary embodiment of the present disclosure and a speed difference calculation method. In the exemplary embodiment of the present disclosure, an observer-type speed difference calculation unit 11 may be used to determine speed difference, as shown.

In the exemplary embodiment of the present disclosure, speed difference to be obtained may be determined as a difference value between measured speed, which is the driving system speed measured by the sensor, and estimated speed, which is the driving system speed estimated using feedforward and feedback modes. In particular, the driving system speed may be motor speed, and the estimated speed compared with the measured speed to calculate speed difference is the reference speed. The estimated speed is obtained from the driving system speed and the vehicle driving information and is used.

In the exemplary embodiment of the present disclosure, the step of the speed difference calculation unit 11 calculating speed difference may include a process of estimating the vehicle driving system speed from the collected vehicle driving information. In addition, the process of estimating the driving system speed may include a step of a feedback calculation unit 12 configured to output a feedback control value using speed difference between the current measured speed of the driving system and estimated speed in the previous control period as input, a step of a feedforward calculation unit 13 configured to determine and output driving system torque from the vehicle driving information, a step of summing the output value of the feedback calculation unit 12 and the output value of the feedforward calculation unit 13 and configured to convert the sum value into driving system angular acceleration using an inertia correction coefficient, and a step of determining estimated speed of the driving system from driving system angular speed obtained by integrating the converted driving system angular acceleration and rate information of a reference torque command.

The construction of the apparatus will be described with reference to FIG. 3. In the exemplary embodiment of the present disclosure, the speed difference calculation unit 11 may include a feedback calculation unit 12 and a feedforward calculation unit 13 to determine driving system speed (estimated speed). In particular, the feedback calculation unit 12 may include an error calculation unit 12a, a P controller 12b, an I controller 12c, and a first summation unit 12d.

The error calculation unit 12a may be configured to receive estimated speed observed in the previous control period as a feedback value. The error calculation unit 12a may be configured to obtain speed difference between measured speed and estimated speed in the previous control period. The speed difference, which is a speed error, becomes input of the P controller 12b and the I controller 12c. In addition, the speed difference calculated by the error calculation unit 12a becomes final speed difference to be obtained through the speed difference calculation unit 11 in the present disclosure.

The P controller 12b may be configured to output a value obtained by multiplying the speed difference (speed error) input from the error calculation unit 12a by a correction coefficient corresponding to P gain to the first summation unit 12d. Additionally, in the I controller 12c, the speed difference input from the error calculation unit 12a is integrated by an error integrator 12c'. The I controller 12c may be configured to output a value obtained by multiplying the integrated value by a correction coefficient corresponding to I gain to the first summation unit 12d. The first summation unit 12d may be configured to output a value obtained by summing the output value of the P controller 12b and the output value of the I controller 12c, and the sum value becomes an output value of the feedback calculation unit 12.

Speed difference may be calculated using an observer configuration shown in FIG. 3. When low pass filter (LPF)-processed speed difference between measured speed and estimated speed is obtained, speed difference due to twisting or backlash of the driving system may be estimated, but lag exists due to characteristics of the LPF. This configuration may be a configuration without the feedforward calculation unit. At this time, only the feedback calculation unit is used. In the feedback calculation unit, one of the P controller and the I controller may be selectively used.

To correct filter lag, an observer configuration using a feedforward item as shown in FIG. 3 may be used. The feedforward calculation unit 13 may include an acceleration model unit 13a based on driving torque, a braking model unit 13b based on braking torque, and a second summation unit 13c.

The acceleration model unit 13a may be configured to correct a torque command determined based on the accelerator position sensor (APS) value in the first controller 10, i.e. a reference torque command, and outputs a corrected torque value to the second summation unit 13c. In particular, the calculated driving torque value may be understood as a driving torque value at a wheel end of a vehicle driving wheel. The acceleration model unit 13a may be configured to convert the reference torque command into a driving torque value at the wheel end or a value corresponding thereto. In the acceleration model unit, a correction coefficient may be a gear ratio between the motor and the driving wheel or a value proportional to the gear ratio.

The braking model unit 13b may be configured to correct a torque command determined based on the brake pedal position sensor (BPS) value in the second controller 20, i.e. a braking torque command, and outputs a corrected braking torque (braking force) value to the second summation unit 13c. In the braking model unit 13b, a correction coefficient may be a coefficient between braking hydraulic pressure and braking force or a value proportional to the gear ratio.

In addition, the feedforward calculation unit 13 may further include an additional model unit configured to determine a torque value using a road surface slope or air resistance as input and to output the determined torque (driving load) value to the second summation unit 13c, and may further include an additional model unit configured to calculate a torque value using an input variable related to driving resistance of the vehicle in addition to the road surface slope or the air resistance and to output the calculated torque value to the second summation unit 13c. In the feedforward calculation unit 13, as described above, the vehicle torque value based on the vehicle driving information is obtained and output in a feedforward mode.

The speed difference calculation unit 11 may further include an observation value summation unit 14, a correction unit 15, an angular acceleration integrator 16, a shaft compliance model unit 17, and a final summation unit 18 in addition to the feedback calculation unit 12 and the feedforward calculation unit 13. In the speed difference calculation unit 11, as described above, the output value of the feedback calculation unit 12 and the output value of the feedforward calculation unit 13 are input to the observation value summation unit 14 so as to be summed. The value summed by and output from the observation value summation unit 14 becomes a torque-dimensional value.

The correction unit 15 may be configured to convert the value summed by and output from the observation value summation unit 14, as described above, into an angular acceleration using an inertia correction coefficient. The inertia correction coefficient, which is related to vehicle equivalent inertia, is preset as a value inversely proportional to the vehicle equivalent inertia (total equivalent weight). In particular, the reason that the term "equivalent" is used is that, in the total weight (mass) of the vehicle related to acceleration and deceleration of the vehicle, values corresponding to a linear movement element and rotary elements having different gear ratios must be included or summed.

In the speed difference calculation unit 11, the value output from the observation value summation unit 14 may be divided by equivalent inertia in the correction unit 15 to obtain an angular acceleration value, and angular acceleration is input to the angular acceleration integrator 16 to be integrated. As a result, an angular speed value is output from the angular acceleration integrator 16, and the angular speed value is input to the final summation unit 18.

A value output from a model unit related to spring compliance of a drive shaft, i.e. the shaft compliance model unit 17, may be input to the final summation unit 18 to be summed with the angular speed value output from the angular acceleration integrator 16. In the final summation unit 18, as described above, the angular speed value output from the angular acceleration integrator 16 and the value output from the shaft compliance model unit 17 may be summed to obtain a final estimated speed value.

In the shaft compliance model unit 17, a reference torque command variation is used as input, and a value obtained by correcting the reference torque command variation by a correction coefficient is output. In particular, the correction coefficient, which is related to an effective spring constant (k in $F=kx$), is preset as a value corresponding to the effective spring constant. In the angular acceleration integrator 16, reset R may be added as needed. The reset is used when shifting intervention, driving wheel conversion, and stationary state correction are needed. At the time of reset, speed in the integrator 16 is reset to measured speed. At this time, the error integrator 12c' of the I controller 12c is reset to 0.

Meanwhile, a first exemplary embodiment of correcting a torque command using the calculated speed difference will be described in detail as an exemplary embodiment of the present disclosure. In the present disclosure, the torque command may be a torque command of the driving device 30 and specifically may be a torque command of the motor configured to drive the vehicle or a torque command of the engine. Additionally, in the present disclosure, operation of the driving device 30 is adjusted according to a final torque command corrected using speed difference.

In the present disclosure, a scheme of changing a final torque command in the previous control period by a torque command variation to determine a final torque command in the current control period is used in determining the final torque command of the driving device. In addition, speed difference calculated by the construction of FIG. 3 and a reference torque command (a torque command before correction, a description of which will follow) are used in determining the torque command variation.

In other words, a torque command variation is determined based on the calculated speed difference and the reference torque command, and the determined torque command variation is applied to a final torque command in the previous control period, which is a torque command feedback value, whereby a final torque command in the current control period changed by the torque command variation is determined. Particularly, the torque command variation may refer to a variation per control period, Additionally, in the following description, the reference torque command will be referred to as a torque command before correction, and the final torque command will be referred to as a torque command after correction.

Figure 4:
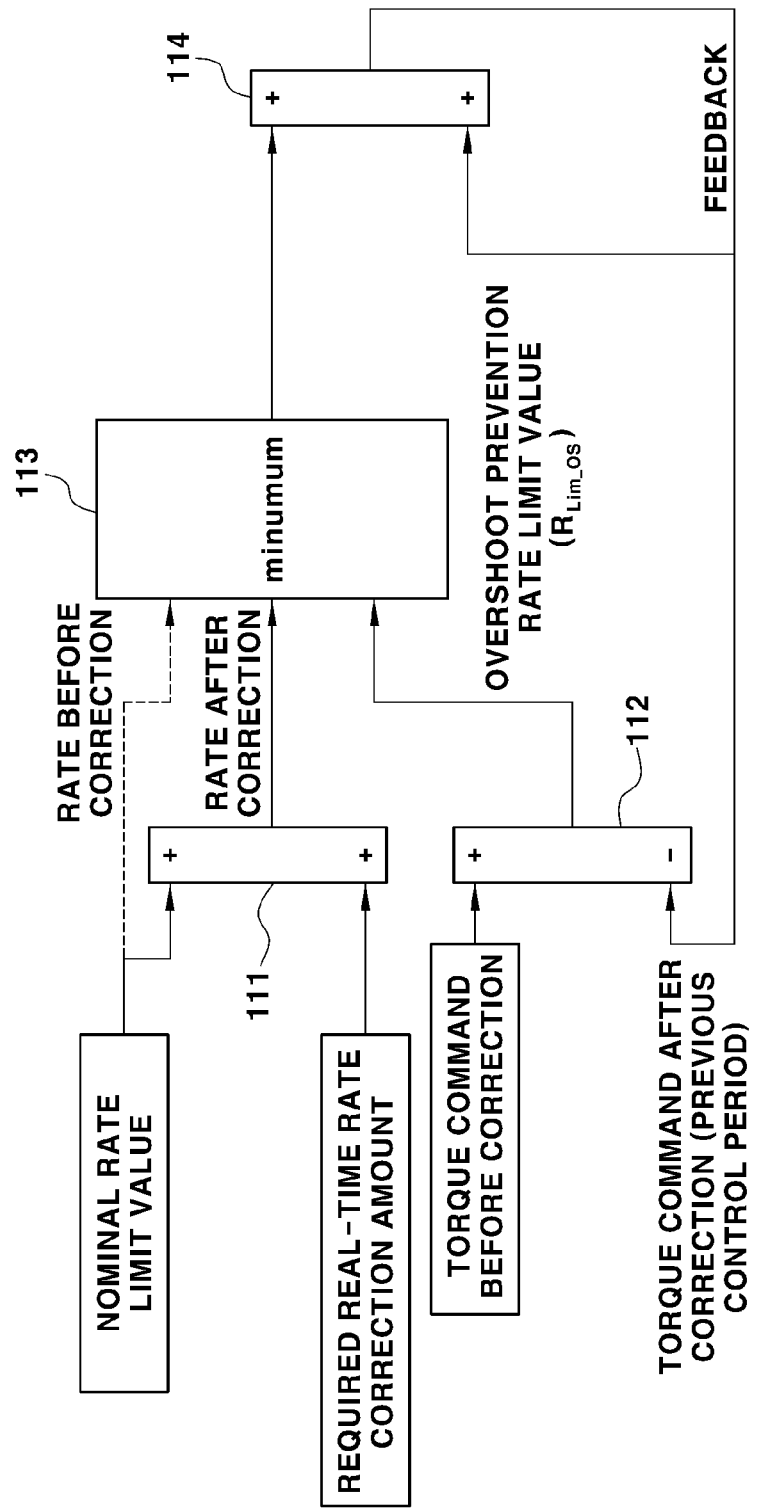
FIG. 4 is a view showing a torque command correction method according to a first exemplary embodiment of the present disclosure.

FIG. 4 is a view showing a torque command correction method according to a first exemplary embodiment of the present disclosure, wherein the construction of a correction logic unit configured to correct a torque command is shown. The correction logic unit has a torque command before correction (raw torque) TqR as input and a torque command after correction (corrected torque) TqC as output. The torque command after correction finally output from the correction logic unit is a final torque command in the current control period, which is a final torque command generated using the torque command before correction, which is a reference torque command, according to set logic, and operation of the driving device 30 is controlled according to this torque command.

The correction logic unit according to the first exemplary embodiment may be provided in the first controller 10 of FIG. 1, and may include a rate correction unit 111, an error calculation unit 112, a variation determination unit 113, and a command correction unit 114, as shown in FIG. 4. In the first exemplary embodiment, a required real-time rate correction amount corresponding thereto is determined from the speed difference calculated by the construction of FIG. 3, and the rate correction unit 111 may be configured to correct a preset rate limit value (hereinafter referred to as a "nominal rate limit value") by the required real-time rate correction amount to determine a rate after correction. At this time, the preset rate limit value may be a rate before correction.

Additionally, in the first exemplary embodiment of the present disclosure, the rate after correction is used in determining a torque command variation. At this time, an overshoot prevention rate limit value $R_{Lim\_OS}$, which may be a torque convergence error, may be further used in order to determine the torque command variation. In particular, the overshoot prevention rate limit value $R_{Lim\_OS}$ is a difference value between the torque command before correction TqR in the current control period and the torque command after correction TqC in the previous control period. More specifically, the overshoot prevention rate limit value $R_{Lim\_OS}$ may be defined as a difference value obtained by subtracting the torque command after correction TqC in the previous control period from the torque command before correction TqR in the current control period. At this time, the torque command after correction TqC in the previous control period is a torque command feedback value that is fed back to correct the torque command in the current control period after being finally determined in the preceding control period by the correction logic unit of FIG. 4.

In the first exemplary embodiment of the present disclosure, the overshoot prevention rate limit value $R_{Lim\_OS}$ is determined by the error calculation unit 112, and the error calculation unit 112 calculates the overshoot prevention rate limit value $R_{Lim\_OS}$, which a difference value between the two commands, using the torque command before correction TqR in the current control period and the torque command after correction TqC in the previous control period as input. As described above, in the first embodiment of the present disclosure, the torque command variation is determined using the nominal rate limit value, which is a rate before correction, the required real-time rate correction amount, and the overshoot prevention rate limit value $R_{Lim\_OS}$.

In the first exemplary embodiment of the present disclosure, the nominal rate limit value is a limit value set based on the vehicle driving state and is a limit value determined by a map or a function, which is setting data, based on current vehicle driving information. Particularly, the vehicle driving information may be speed or torque of the motor (or the engine) or speed and torque of the motor (or the engine). At this time, the nominal rate limit value, which is determined to be a value based on speed or torque of the motor (or the engine) or a value based on speed and torque of the motor, is a limit value preset by a map or a function. Here, torque may be a torque command after correction in the previous control period.

Consequently, the nominal rate limit value based on the current vehicle driving information may be determined by the map or the function having a limit value set to a value based on the vehicle driving information, and the determined nominal rate limit value may be used as input for torque command correction.

The required real-time rate correction amount may be determined to be a value corresponding to the speed difference calculated by the construction of FIG. 3. At this time, a map or a function, which is preset data, may be used to determine the required real-time rate correction amount corresponding thereto from the speed difference. In the first embodiment of the present disclosure, the required real-time rate correction amount is used in correcting the nominal rate limit value, i.e. the rate of a limit value. The rate correction unit 111 may sum the nominal rate limit value and the required real-time rate correction amount, and may determine the sum value to be a rate after correction.

The torque command before correction TqR is a reference torque command in the current control period determined by the first controller 20 in the construction of FIG. 1. In addition, the torque command after correction TqC, which is used as another input for torque command correction, is a torque command after correction in the previous control period and is a final torque command that is fed back after being finally determined in the previous control period.

In the first exemplary embodiment of the present disclosure, the error calculation unit 112 may be configured to determine the difference value between the torque command before correction TqR in the current control period and the torque command after correction TqC in the previous control period to be the overshoot prevention rate limit value $R_{Lim\_OS}$, as previously described. Additionally, in the first exemplary embodiment of the present disclosure, when the rate after correction and the overshoot prevention rate limit value are determined, as described above, the variation determination unit 113 may be set to determine a smaller one of input values to be a torque command variation using the rate after correction and the overshoot prevention rate limit value $R_{Lim\_OS}$ as input, as shown in FIG. 4.

In particular, to determine the torque command variation, the variation determination unit 113 may further use a rate before correction, i.e. a nominal rate limit value. As described above, the variation determination unit 113 may be configured to selectively use the rate before correction. When the rate before correction is used, the variation determination unit 113 may be configured to determine the minimum value, among the rate after correction, the overshoot prevention rate limit value $R_{Lim\_OS}$, and the rate before correction, to be a torque command variation.

When the torque command variation is determined by the variation determination unit 113, as described above, the command correction unit 114 may be configured to determine a corrected torque command in the current control period, i.e. a new torque command after correction in the current control period, using the determined torque command variation and the torque command after correction in the previous control period, which is a feedback value.

At this time, the command correction unit 114 may be configured to correct the torque command after correction in the previous control period by the torque command variation to determine a torque command after correction in the current control period, and may be set to sum the torque command after correction in the previous control period and the torque command variation and to determine the sum value to be a new torque command after correction.

The first exemplary embodiment shown in FIG. 4 relates to a torque command correction method in the situation in which torque is increasing, i.e. the situation in which the torque command before correction TqR is greater than the torque command after correction TqC that is fed back. In particular, the torque command before correction TqR is a reference torque command in the current control period, and the torque command after correction TqC that is fed back is a final torque command in the previous control period determined by the correction logic unit. In the present disclosure, the situation in which the torque command before correction TqR in the current control period is greater than the torque command after correction TqC in the previous control period is defined as the situation in which torque is increasing, and the reverse situation is defined as the situation in which torque is decreasing.

The first exemplary embodiment shown in FIG. 4 is an exemplary embodiment in the situation in which torque is increasing. In the first exemplary embodiment, therefore, the overshoot prevention rate limit value is a positive (+) value. At this time, the nominal rate limit value may be set and determined to be a positive (+) value having the same sign as the overshoot prevention rate limit value, which is one of a positive (+) value and a negative (−) value. However, the required real-time rate correction amount may be a positive (+) value or a negative (−) value.

Additionally, in the present disclosure, the nominal rate limit value may be a scalar amount having no directivity, and each of the required real-time rate correction amount and the overshoot prevention rate limit value may be a vector amount. In particular, the "vector" is a value having directivity already imparted thereto, and refers to a value that does not need to distinguish between increasing and decreasing of torque.

On the other hand, the "scalar" is a value having no directivity imparted thereto. In the first exemplary embodiment, the nominal rate limit value, which is a scalar amount, may be a value specified based on the situation in which torque is increasing. In the first exemplary embodiment, the nominal rate limit value is set to a positive (+) value, which has the same sign as the overshoot prevention rate limit value $R_{Lim\_OS}$. In the present disclosure, however, the nominal rate limit value, which is a scalar amount, may be set to a value having a different sign than the overshoot prevention rate limit value $R_{Lim\_OS}$, which is one of a positive (+) value and a negative (−) value, irrespective of situations.

Figure 5A:
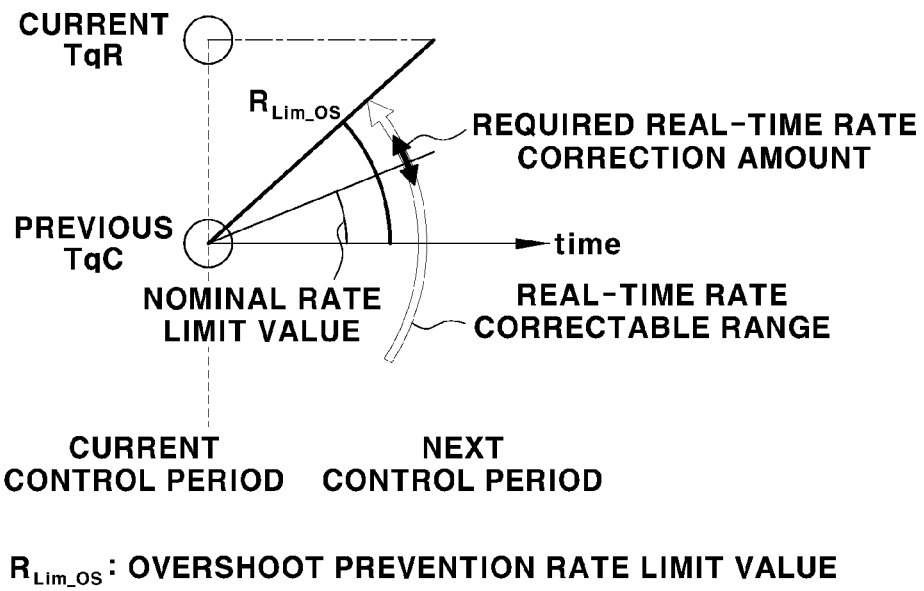
FIGS. 5A and 5B are views showing a real-time rate correctable range in the first exemplary embodiment of the present disclosure.
Figure 5B:
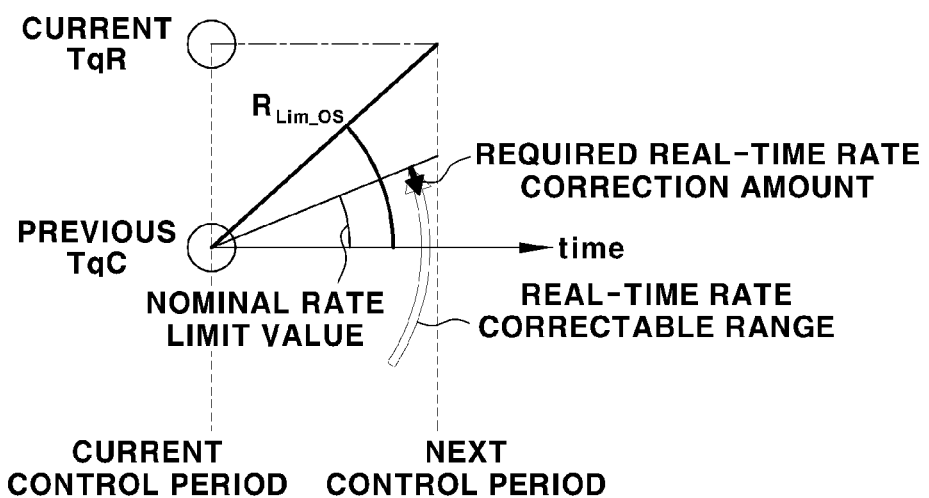

FIGS. 5A and 5B show a real-time rate correctable range when the torque command correction method according to the first exemplary embodiment is applied. FIG. 5A shows an example of when the variation determination unit 113 determines a variation using only the rate after correction and the overshoot prevention rate limit value $R_{Lim\_OS}$ without using the rate before correction. FIG. 5B shows an example of when the variation determination unit 113 determines a variation using all of the rate before correction (i.e. the nominal rate limit value), the rate after correction, and the overshoot prevention rate limit value $R_{Lim\_OS}$.

As shown in FIGS. 5A and 5B, the overshoot prevention rate limit value $R_{Lim\_OS}$ is a positive (+) value. At this time, the nominal rate limit value may be set and determined to be a positive (+) value, and the required real-time rate correction amount may be a positive (+) or negative (−) value. When the rate before correction (i.e. the nominal rate limit value) is further used, as shown in FIG. 5B, the real-time rate correctable range cannot exceed the rate before correction, i.e. the nominal rate limit value. At the time of correction, the torque command rate and the torque command variation may be limited to the nominal rate limit value.

In FIGS. 5A and 5B, the overshoot prevention rate limit value $R_{Lim\_OS}$ is shown as being greater than the nominal rate limit value, which, however, is illustrative. The overshoot prevention rate limit value may be a value less than the nominal rate limit value. As described above, in the first exemplary embodiment, both the overshoot prevention rate limit value and the nominal rate limit value, each of which is one of a positive (+) value and a negative (−) value, may be set or determined to be the same positive (+) or negative (−) values, and the sum of the nominal rate limit value and the required real-time rate correction amount may be determined to be a rate after correction.

When the overshoot prevention rate limit value is a positive (+) value, a smaller one of the rate after correction and the overshoot prevention rate limit value may be determined to be a torque command variation. When the overshoot prevention rate limit value is a negative (+) value, a larger one of the rate after correction and the overshoot prevention rate limit value may be determined to be a torque command variation.

Figure 6:
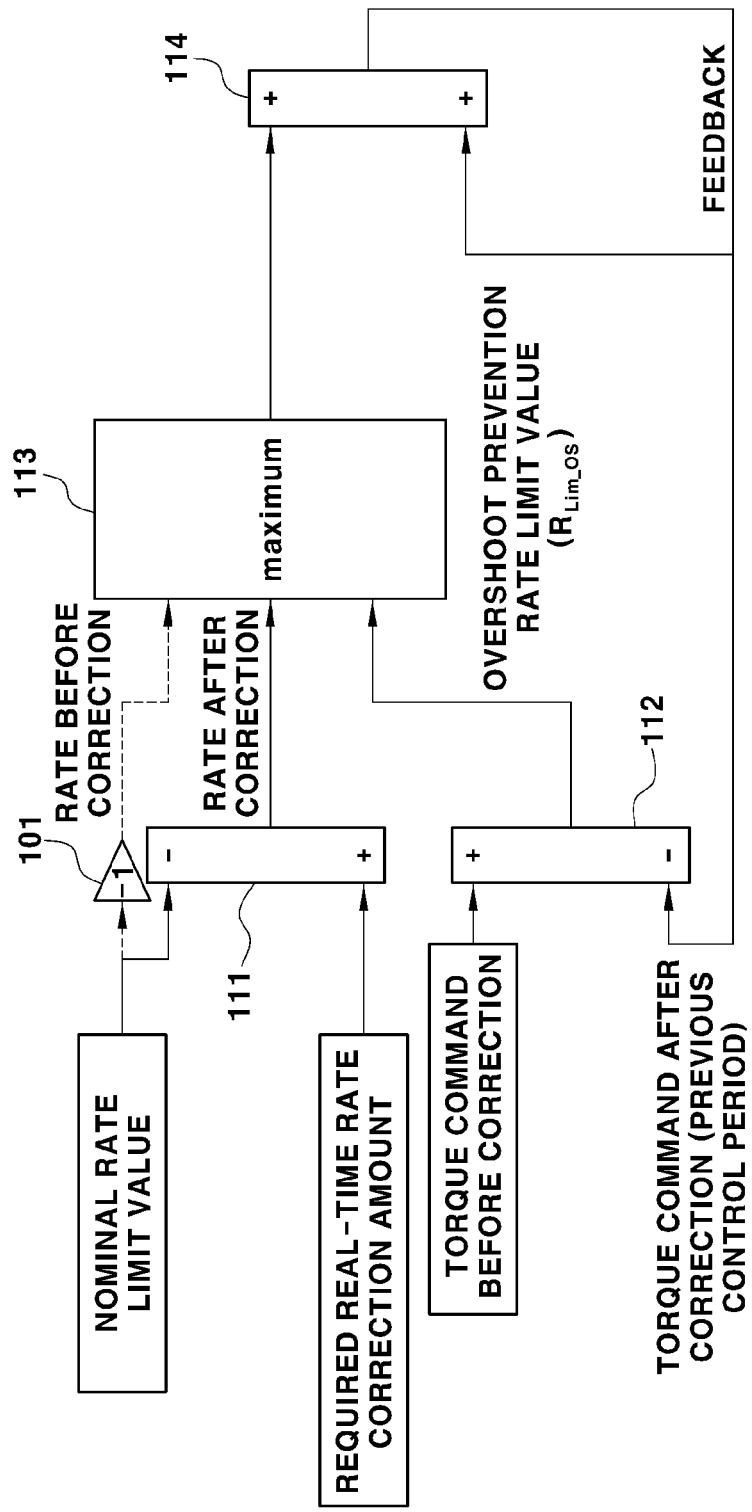
FIG. 6 is a view showing a torque command correction method according to a second exemplary embodiment of the present disclosure.

Next, FIG. 6 is a view showing a torque command correction method according to a second embodiment of the present disclosure. The first exemplary embodiment shown in FIG. 4 relates to a correction method in the situation in which torque is increasing, whereas the second embodiment shown in FIG. 6 relates to a correction method in the situation in which torque is decreasing.

Even in the second exemplary embodiment, the nominal rate limit value may be set to a scalar amount. At this time, the nominal rate limit value, which is a scalar amount, may be set and determined to be a positive (+) value, in the same manner as in the first exemplary embodiment. In the situation in which torque is decreasing, as in the second embodiment, a value having a sign opposite the situation in which torque is increasing through change between positive (+) and negative (−) signs is used as the nominal rate limit value. In other words, as shown in FIG. 6, a limit value obtained by multiplying the nominal rate limit value by −1 may be used as input of the correction logic unit.

For example, when the overshoot prevention rate limit value $R_{Lim\_OS}$ and the nominal rate limit value are values having opposite signs, each of which is one of a positive (+) value and a negative (−) value, the nominal rate limit value is multiplied by −1 to reverse the sign of the nominal rate limit value, and the nominal rate limit value having the changed sign is used. In other words, the nominal rate limit value having the changed sign and the required real-time rate correction amount are summed to determine a rate after correction.

Referring to FIG. 6, a correction logic unit configured to correct a torque command has a torque command before correction (raw torque) TqR as input and a torque command after correction (corrected torque) TqC as output, in the same manner as in the first embodiment. In addition, the torque command after correction finally output from the correction logic unit is a final torque command generated using the torque command before correction, which is a reference torque command, according to set logic, and operation of the driving device 30 is controlled according to this torque command.

The correction logic unit according to the second exemplary embodiment may also be provided in the first controller 10 of FIG. 1, and may include a rate correction unit 111, an error calculation unit 112, a variation determination unit 113, and a command correction unit 114, as shown in FIG. 6. In addition, the correction logic unit according to the second exemplary embodiment may further include a conversion unit 101 configured to change the sign of a nominal rate limit value.

The second exemplary embodiment is different from the first exemplary embodiment in that the conversion unit 101 configured to change the sign of the nominal rate limit value and to input the nominal rate limit value having the changed sign to the variation determination unit 113 is further used, in that the variation determination unit 113 uses the nominal rate limit value having the sign changed by the conversion unit 101, in that the overshoot prevention rate limit value $R_{Lim\_OS}$ is a negative (−) value since there is the situation in which torque is decreasing, and in that the variation determination unit 113 may be configured to determine the maximum one of the input values, rather than the minimum value, to be a torque command variation. In addition, the second exemplary embodiment is different from the first exemplary embodiment in that the rate correction unit 111 changes the sign of the nominal rate limit value and corrects the rate of the limit value having the changed sign.

Specifically, in the second exemplary embodiment, a required real-time rate correction amount corresponding thereto is determined from the speed difference calculated by the construction of FIG. 3, and the rate correction unit 111 changes the sign of a nominal rate limit value and corrects the nominal rate limit value having the changed sign by the required real-time rate correction amount to determine a rate after correction.

At this time, the rate correction unit 111 reverses the sign of a nominal rate limit value input thereto, i.e. changes a positive (+) value to a negative (−) value, in order to use the nominal rate limit value. The sign may be changed by multiplying the input nominal rate limit value by −1. In addition, the rate correction unit 111 may be configured to sum the nominal rate limit value having the changed sign and the required real-time rate correction amount, and determine the sum value to be a rate after correction.

The variation determination unit 113 may be configured to receive the nominal rate limit value having the sign changed by the conversion unit 101 and uses the received nominal rate limit value as a rate before correction. Change of the sign of the nominal rate limit value by the conversion unit 101 may be performed by multiplying a nominal rate limit value before sign change input thereto by −1.

In addition, the nominal rate limit value having the changed sign, i.e. the rate before correction, may also be selectively used in the second exemplary embodiment, in the same manner as in the first embodiment. In other words, as shown in FIG. 6, the variation determination unit 113 may be set to have only the rate after correction and the overshoot prevention rate limit value $R_{Lim\_OS}$ as input and to determine the largest one of the input values to be a torque command variation.

Particularly, to determine the torque command variation, the variation determination unit 113 may further use the rate before correction, i.e. the nominal rate limit value having the changed sign. As described above, the variation determination unit 113 may exemplary selectively use the rate before correction, and determine the largest value of the rate before correction, the rate after correction, and the overshoot prevention rate limit value $R_{Lim\_OS}$ to be a torque command variation.

Since the second exemplary embodiment is an embodiment in the situation in which torque is decreasing, the overshoot prevention rate limit value $R_{Lim\_OS}$ is a negative (−) value. In addition, the nominal rate limit value may be a positive (+) value even in the second embodiment, in the same manner as in the first exemplary embodiment. In other words, in the second exemplary embodiment, the nominal rate limit value may be a value having a sign opposite the sign of the overshoot prevention rate limit value $R_{Lim\_OS}$. At this time, the rate before correction, which is the nominal rate limit value having the changed sign becomes a negative (−) value, which is the same value as the overshoot prevention rate limit value $R_{Lim\_OS}$.

However, the required real-time rate correction amount may be a positive (+) value or a negative (−) value. In addition, that the variation determination unit 113 determines the maximum one of the input values to be a torque command variation indicates that, in the case in which the input values are all negative values, the value having the minimum absolute value is determined to be a torque command variation.

When the torque command variation is determined by the variation determination unit 113, as described above, the command correction unit 114 may be configured to determine a corrected final torque command in the current control period, i.e. a new torque command after correction in the current control period, using the determined torque command variation and the torque command after correction in the previous control period, which is a feedback value.

At this time, the command correction unit 114, which is a component configured to correct the torque command after correction in the previous control period by the torque command variation to determine a torque command after correction in the current control period, may sum the torque command after correction in the previous control period and the torque command variation and may determine the sum value to be a new torque command after correction.

To summarize the second exemplary embodiment, in the case in which the overshoot prevention rate limit value and the nominal rate limit value are determined to be values having opposite signs, each of which is one of a positive (+) value and a negative (−) value, the nominal rate limit value is multiplied by −1 to reverse the sign of the nominal rate limit value, and a value obtained by summing the nominal rate limit value having the changed sign and the required real-time rate correction amount is determined to be a rate after correction.

At this time, in the second exemplary embodiment, when the overshoot prevention rate limit value is a positive (+) value, a smaller one of the rate after correction and the overshoot prevention rate limit value is determined to be a torque command variation. When the overshoot prevention rate limit value is a negative (−) value, a larger one of the rate after correction and the overshoot prevention rate limit value is determined to be a torque command variation.

The torque command correction method in the situation in which torque is increasing and the torque command correction method in the situation in which torque is decreasing have been described above. The torque command before correction TqR in the current control period and the torque command after correction TqC in the previous control period may be compared with each other to determine the situation in which torque is increasing or the situation in which torque is decreasing, and the method according to the first exemplary embodiment or the method according to the second exemplary embodiment may be selected and used based on the result of determination.

The first exemplary embodiment and the second exemplary embodiment are examples of the case in which the same setting data (map or equation) are used to determine the nominal rate limit value. The methods according to the two exemplary embodiments may be torque command correction methods when the nominal rate limit values are set to values having the same sign, for example positive values. In addition, the methods according to the two exemplary embodiments may be methods in the case in which the nominal rate limit values in the situation in which torque is increasing and in the situation in which torque is decreasing are set to the same value under the same vehicle driving conditions.

When both the nominal rate limit values are set to positive values, as described above, one of the methods according to the first exemplary embodiment and the second exemplary embodiment is selected and used based on whether the situation is the situation in which torque is increasing or the situation in which torque is decreasing. In particular, one piece of setting data may be used as setting data (map or equation) preset by the controller to determine the nominal rate limit value according thereto using torque or speed of the driving device as input without distinction between the first exemplary embodiment and the second exemplary embodiment.

However, the situation in which torque is increasing and the situation in which torque is decreasing may be distinguished from each other, and the nominal rate limit value itself preset to a value based on torque or speed of the driving device may be set to values having opposite signs in the two situations. In particular, setting data for determining the nominal rate limit value in the situation in which torque is increasing and setting data for determining the nominal rate limit value in the situation in which torque is decreasing are separately needed.

For example, in the situation in which torque is increasing, the nominal rate limit value may be determined to be a positive (+) value from the setting data (map or equation). In the situation in which torque is decreasing, the nominal rate limit value may be determined to be a negative (−) value from the setting data. In particular, torque command correction may be performed using the method of FIG. 4.

In addition, when the setting data of the nominal rate limit value used in the situation in which torque is increasing and the setting data of the nominal rate limit value used in the situation in which torque is decreasing are separately set, the nominal rate limit values of the two setting data may be set not only to have opposite signs but also to be different setting values under the same input value conditions. For example, in the case in which the setting data are maps, map values corresponding to the same input values may be differently set in the two maps.

Figure 7A:
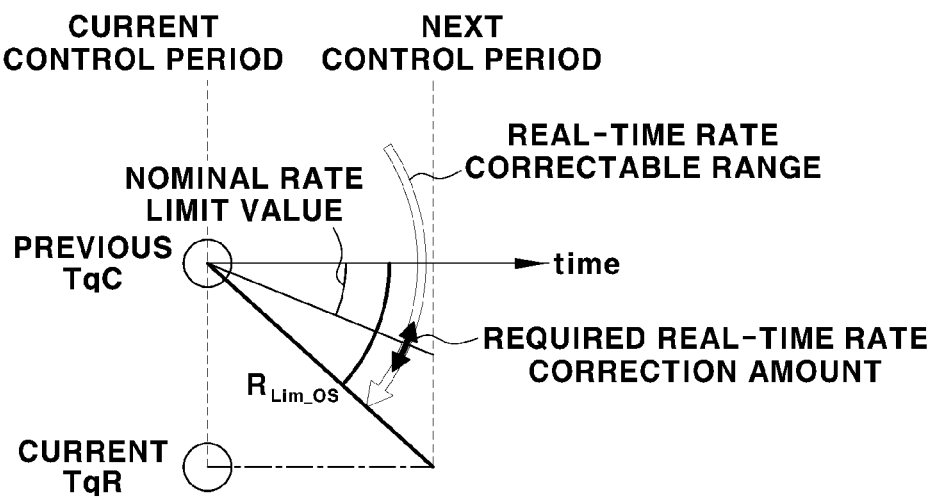
FIGS. 7A and 7B are views showing a real-time rate correctable range in the second exemplary embodiment of the present disclosure.
Figure 7B:
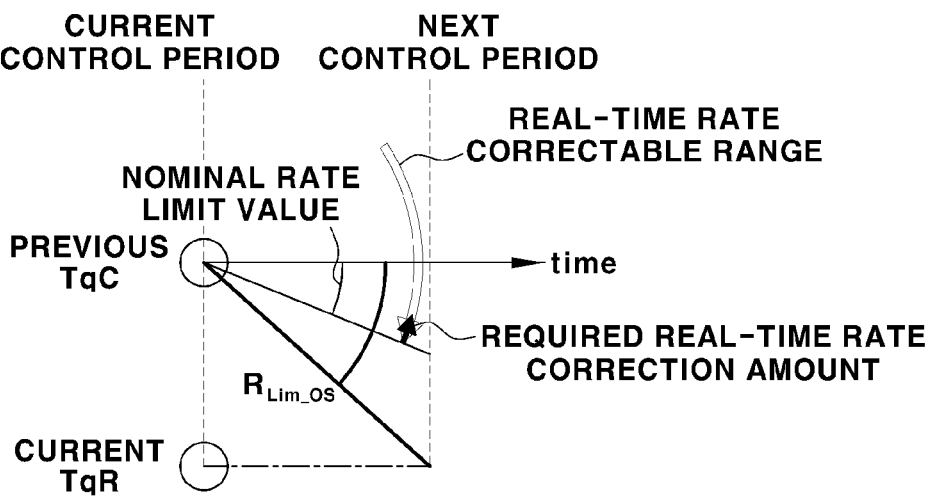

FIGS. 7A and 7B show a real-time rate correctable range when the torque command correction method according to the second exemplary embodiment is applied. In FIGS. 7A and 7B, the nominal rate limit value is a nominal rate limit value having a reversed sign. FIG. 7A shows an example of when the variation determination unit 113 determines a variation using only the rate after correction and the overshoot prevention rate limit value $R_{Lim\_OS}$ without using the rate before correction. FIG. 7B shows an example of when the variation determination unit 113 determines a variation using all of the rate before correction (i.e. the nominal rate limit value having the changed sign), the rate after correction, and the overshoot prevention rate limit value $R_{Lim\_OS}$.

As shown in FIGS. 7A and 7B, the overshoot prevention rate limit value $R_{Lim\_OS}$ is a negative (−) value. At this time, the nominal rate limit value having the changed sign is a negative (−) value. At this time, the required real-time rate correction amount may be a positive (+) or negative (−) value. However, in the case in which the rate before correction, i.e. the nominal rate limit value having the changed sign, is further used, as shown in FIG. 7B, the real-time rate correctable range cannot be a value less than the nominal rate limit value having the changed sign. At the time of correction, the torque command rate and the torque command variation are limited to the nominal rate limit value having the changed sign.

In FIGS. 7A and 7B, the overshoot prevention rate limit value $R_{Lim\_OS}$ is shown as being less than the nominal rate limit value having the changed sign, which, however, is illustrative. The overshoot prevention rate limit value may be a value greater than the nominal rate limit value.

To summarize the first exemplary embodiment and the second exemplary embodiment described above, basically, in the case in which there is no required real-time rate correction amount, the rate after correction, which is input of the variation determination unit 113, becomes the nominal rate limit value. In addition, the nominal rate limit value is increased or decreased by the required real-time rate correction amount and is then input to the variation determination unit 113.

In the second exemplary embodiment shown in FIG. 6, in the case in which the size of the nominal rate limit value and the size of the required real-time rate correction amount are the same, the rate after correction becomes 0. Since the rate after correction, which is a value of 0, is a value greater than the overshoot prevention rate limit value $R_{Lim\_OS}$, which is a negative (−) value, the torque command variation becomes 0 in the variation determination unit 113, and the torque command before correction becomes a final torque command after correction.

Furthermore, in the second exemplary embodiment, in the case in which the size of the required real-time rate correction amount is greater than the size of the nominal rate limit value, the torque command after correction TqC may not move in a direction of converging on the torque command before correction TqR but rather in the retrogression direction.

In addition, a method of acquiring a rate after correction by multiplying the nominal rate limit value by a scale factor determined to be a value corresponding to the required real-time rate correction amount in the rate correction unit 111 may also be applied in addition to the scheme of summing the nominal rate limit value (the nominal rate limit value having the changed sign in the second embodiment) and the required real-time rate correction amount in order to acquire the rate after correction, as described above. In particular, a value set to a function of the required real-time rate correction amount by the rate correction unit 111 in the controller 10 may be used as the scale factor.

In addition, even though the required real-time rate correction amount acts in a direction of releasing the nominal rate limit value, the maximum value of the rate is limited by the overshoot prevention rate limit value. When the torque command after correction TqC in the previous control period has already converged on the torque command before correction TqR (TqC==TqR), therefore, the torque command rate and variation become 0 irrespective of the nominal rate limit value or the required real-time rate correction amount.

As shown in FIGS. 5A, 5B, 7A, and 7B, the difference between that the variation determination unit 113 uses the rate before correction and that the variation determination unit 113 does not use the rate before correction is based on whether to limit a rate corrected in real time to the nominal rate limit value. When the rate before correction is not used, the nominal rate limit value is not considered as the maximum allowable rate, as shown in FIGS. 5A and 7A. Consequently, the corrected rate may exceed the nominal rate limit value, and therefore a torque command after correction TqC may be calculated.

When the rate before correction is used, however, the nominal rate limit value is used as the maximum allowable rate, as shown in FIGS. 5B and 7B. As a result, the rate after correction cannot exceed the nominal rate limit value irrespective of the value of the required real-time rate correction amount.

In brief, when the rate before correction is not used, a rate capable of best preventing the torque command convergence state TqC==TqR is selected from between the overshoot prevention rate limit value $R_{Lim\_OS}$ and the rate after correction and used as the corrected rate and variation of the torque command. When the rate before correction is used, on the other hand, a rate capable of best preventing the torque command convergence state TqC==TqR is selected from among the overshoot prevention rate limit value $R_{Lim\_OS}$, the rate before correction, and the rate after correction and used as the corrected rate and variation of the torque command.

Figure 8:
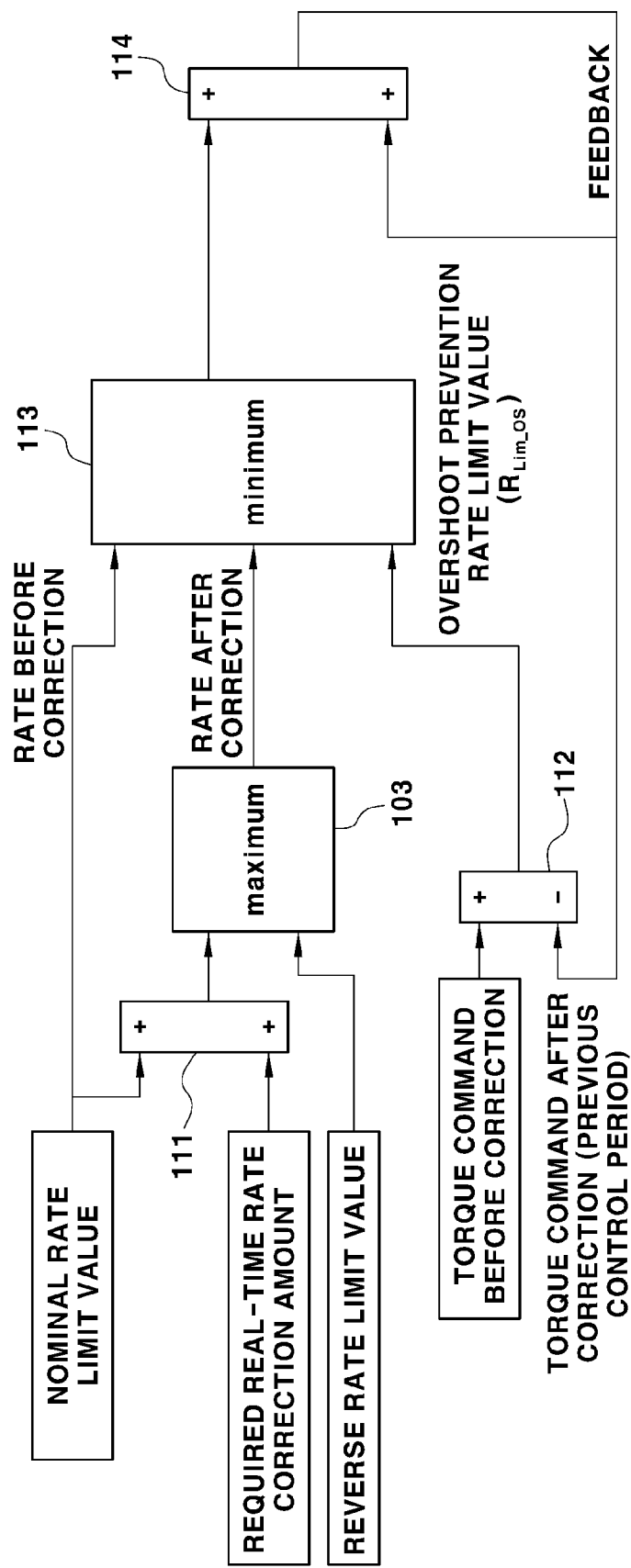
FIG. 8 is a view showing a torque command correction method according to a third exemplary embodiment of the present disclosure.

Next, FIG. 8 is a view showing a torque command correction method according to a third embodiment of the present disclosure. In the third exemplary embodiment, a reverse rate limit value is further set and used. In particular, the reverse rate limit value is also set to a scalar amount having no directivity and used. In addition, the reverse rate limit value may be a preset constant or a value determined by setting data, such as a map or a function, from speed difference, driving system speed, or the torque command after correction TqC in the previous control period calculated by the construction of FIG. 3.

The driving system speed may be rotational speed of a part at an arbitrary position between the driving device and the driving wheel. For example, the driving system speed may be not only engine speed or motor speed but also rotational speed of the drive shaft, input and output rotational speed of the transmission or the decelerator, or rotational speed of the driving wheel.

The third exemplary embodiment relates to a torque command correction method in the situation in which torque is increasing, in the same manner as in the first exemplary embodiment. When compared with the first exemplary embodiment of FIG. 4, a rate limit unit 103 is further provided between the rate correction unit 111 and the variation determination unit 113. In other words, the rate correction unit 111 may be configured to correct the nominal rate limit value by the required real-time rate correction amount, and a value obtained by limiting the corrected rate by the reverse rate limit value by the rate limit unit 103 is finally determined as the rate after correction.

In the third exemplary embodiment, the overshoot prevention rate limit value $R_{Lim\_OS}$ is a positive (+) value. At this time, the reverse rate limit value may be set to a negative (−) value, which is a value having a sign opposite the sign of the overshoot prevention rate limit value $R_{Lim\_OS}$. Additionally, in the rate limit unit 103 of the third exemplary embodiment, a larger one of the rate corrected by the required real-time rate correction amount and the reverse rate limit value is determined to be a rate after correction. For example, in the third embodiment, the rate corrected by the rate correction unit 111 is limited by the reverse rate limit value in the rate limit unit 103.

The remaining processes of the third exemplary embodiment are not different from those of the first embodiment of FIG. 4 except that the reverse rate limit value is applied and the rate limit unit 103 is further used in order to determine the rate after correction. Additionally, in the third exemplary embodiment, the rate before correction may be used as input of the variation determination unit 113.

Figure 9:
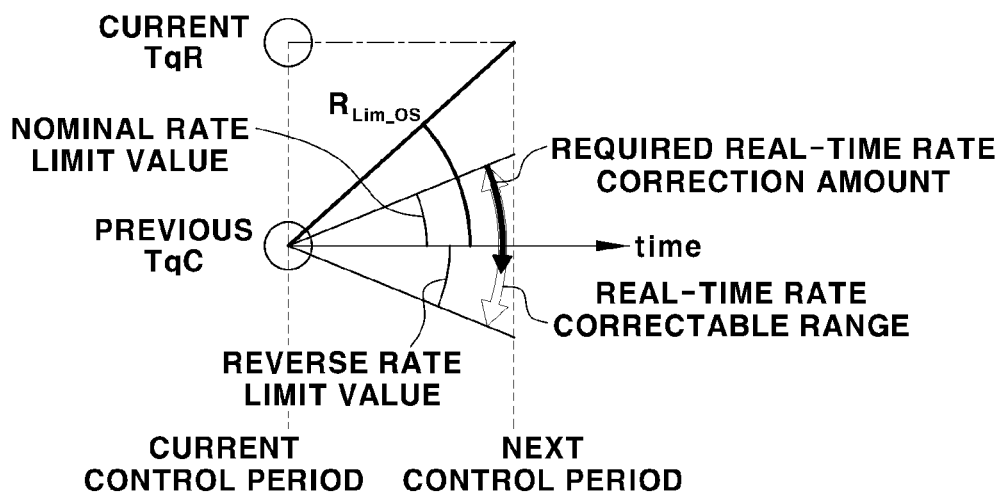
FIG. 9 is a view showing a real-time rate correctable range in the third exemplary embodiment of the present disclosure.

FIG. 9 is a view showing a real-time rate correctable range in the third embodiment of the present disclosure. As shown, the real-time rate correctable range is limited to a range between the reverse rate limit value and the nominal rate limit value. At this time, when the overshoot prevention rate limit value is less than the nominal rate limit value, rate limiting is performed by the overshoot prevention rate limit value instead of the nominal rate limit value. This is equally applied to the first exemplary embodiment shown in FIG. 5B.

Figure 10:
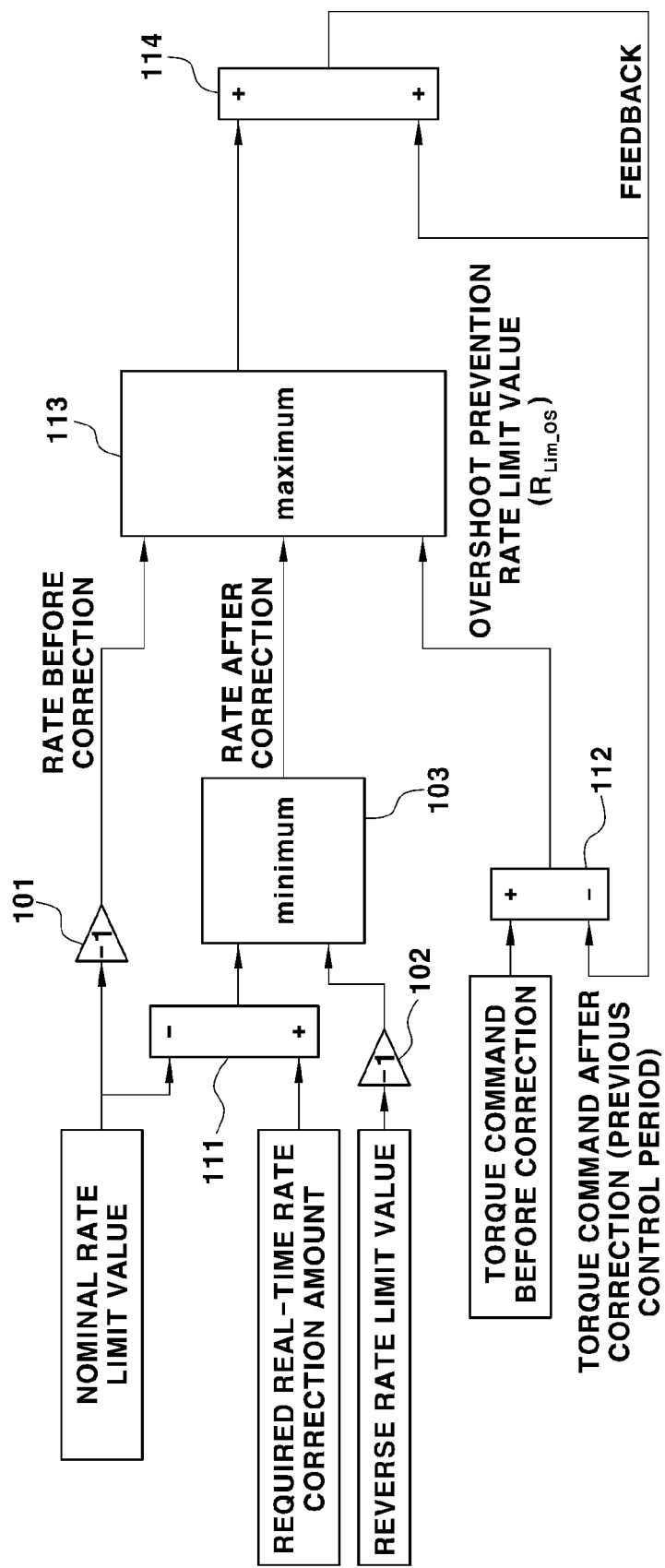
FIG. 10 is a view showing a torque command correction method according to a fourth embodiment of the present disclosure.

Next, FIG. 10 is a view showing a torque command correction method according to a fourth exemplary embodiment of the present disclosure. Even in the fourth exemplary embodiment, a reverse rate limit value is further set and used, in the same manner as in the third embodiment. The reverse rate limit value of the fourth exemplary embodiment may also be set to a scalar amount having no directivity and used. In addition, the reverse rate limit value in the fourth exemplary embodiment may also be a preset constant or a value determined by setting data, such as a map or a function, from speed difference, driving system speed, or the torque command after correction TqC in the previous control period.

The fourth exemplary embodiment relates to a torque command correction method in the situation in which torque is decreasing, in the same manner as in the second exemplary embodiment. When compared with the second exemplary embodiment of FIG. 6, a rate limit unit 103 is further provided between the rate correction unit 111 and the variation determination unit 113. When compared with the third exemplary embodiment of FIG. 8, a conversion unit 102 configured to change the sign of a reverse rate limit value (hereinafter referred to as a "second conversion unit") is added to an input end of the rate limit unit 103. Consequently, the reverse rate limit value having the sign changed by the second conversion unit 102 is input to the rate limit unit 103.

The reverse rate limit value may be changed from a negative (−) value to a positive (+) value by the second conversion unit 102. As a result, the reverse rate limit value may be changed to a positive (+) value and may then be input to the rate limit unit. Since the fourth exemplary embodiment is an exemplary embodiment in the situation in which torque is decreasing, the overshoot prevention rate limit value $R_{Lim\_OS}$ is a negative (−) value. In addition, the nominal rate limit value may be a positive (+) value, in the same manner as in the third exemplary embodiment. In other words, in the fourth exemplary embodiment, the nominal rate limit value may be a value having a sign opposite the sign of the overshoot prevention rate limit value $R_{LimOS}$. At this time, the rate before correction, which is the nominal rate limit value having the sign changed by the conversion unit 101 (hereinafter referred to as a "first conversion unit"), is a negative (−) value, which has the same sign as the overshoot prevention rate limit value.

In the fourth exemplary embodiment, the reverse rate limit value may be a negative (−) value, in the same manner as in the third exemplary embodiment. As described above, in the fourth exemplary embodiment, the reverse rate limit value may be a value having the same sign as the overshoot prevention rate limit value $R_{Lim\_OS}$, which is a negative (−) value. At this time, the reverse rate limit value having the changed sign is a positive (+) value, which is a value having a sign opposite the sign of the overshoot prevention rate limit value $R_{Lim\_OS}$. When the reverse rate limit value is a value having the same sign as the overshoot prevention rate limit value, as described above, the reverse rate limit value is multiplied by −1 to change to a value having the opposite sign. When the reverse rate limit value is a value having a sign opposite the sign of the overshoot prevention rate limit value, as in the third exemplary embodiment, the reverse rate limit value is used without sign change.

Additionally, in the fourth exemplary embodiment, the nominal rate limit value having the changed sign is corrected by the required real-time rate correction amount in the rate correction unit 111, and a value obtained by limiting, by the rate limit unit 103, the corrected rate by the reverse rate limit value having the sign changed by the second conversion unit 102 is determined as the rate after correction. At this time, in the rate limit unit 103, a smaller one of the rate corrected by the required real-time rate correction amount and the reverse rate limit value having the changed sign is determined as the rate after correction. In brief, in the fourth exemplary embodiment, the rate corrected by the rate correction unit 111 is limited by the reverse rate limit value having the changed sign.

The remaining processes are not different from those of the second exemplary embodiment shown in FIG. 6 except that the reverse rate limit value is applied and the rate limit unit 103 is further used in order to determine the rate after correction. Additionally, in the fourth embodiment, the rate before correction may be used as input of the variation determination unit 113. At this time, the rate before correction is a nominal rate limit value having the sign reversely converted by the first conversion unit 101.

Figure 11:
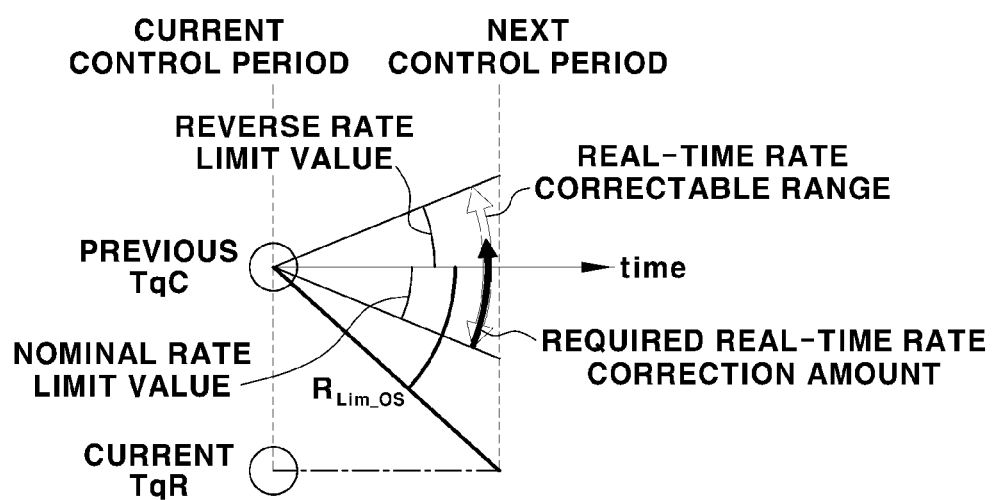
FIG. 11 is a view showing a real-time rate correctable range in the fourth exemplary embodiment of the present disclosure.

FIG. 11 is a view showing a real-time rate correctable range in the fourth exemplary embodiment of the present disclosure. As shown, the real-time rate correctable range is limited to a range between the reverse rate limit value having the changed sign and the nominal rate limit value. At this time, when the overshoot prevention rate limit value is greater than the nominal rate limit value, rate limiting is performed by the overshoot prevention rate limit value instead of the nominal rate limit value. This is equally applied to the second embodiment shown in FIG. 7B.

Since the reverse rate limit value is further used, as described above, each of the third embodiment and the fourth exemplary embodiment further has a function of limiting the width at which the rate retrogresses. Even though the required real-time rate correction amount corrects the nominal rate limit value, therefore, the range cannot exceed the reverse rate limit value or the reverse rate limit value having the changed sign. In addition, when the reverse rate limit value is a negative (−) value, TqC may be set to retrogress while being derated from TqR according to the required real-time rate correction amount even in the torque command convergence state TqC=TqR.

In brief, in the third and fourth exemplary embodiments, a rate capable of best preventing the torque command convergence state TqC=TqR is selected from among the overshoot prevention rate limit value $R_{Lim\_OS}$, the rate before correction, and the rate after correction and used as the corrected rate and variation of the torque command. However, the rate after correction cannot be set to a value deviating from the reverse rate limit value.

Figure 12:
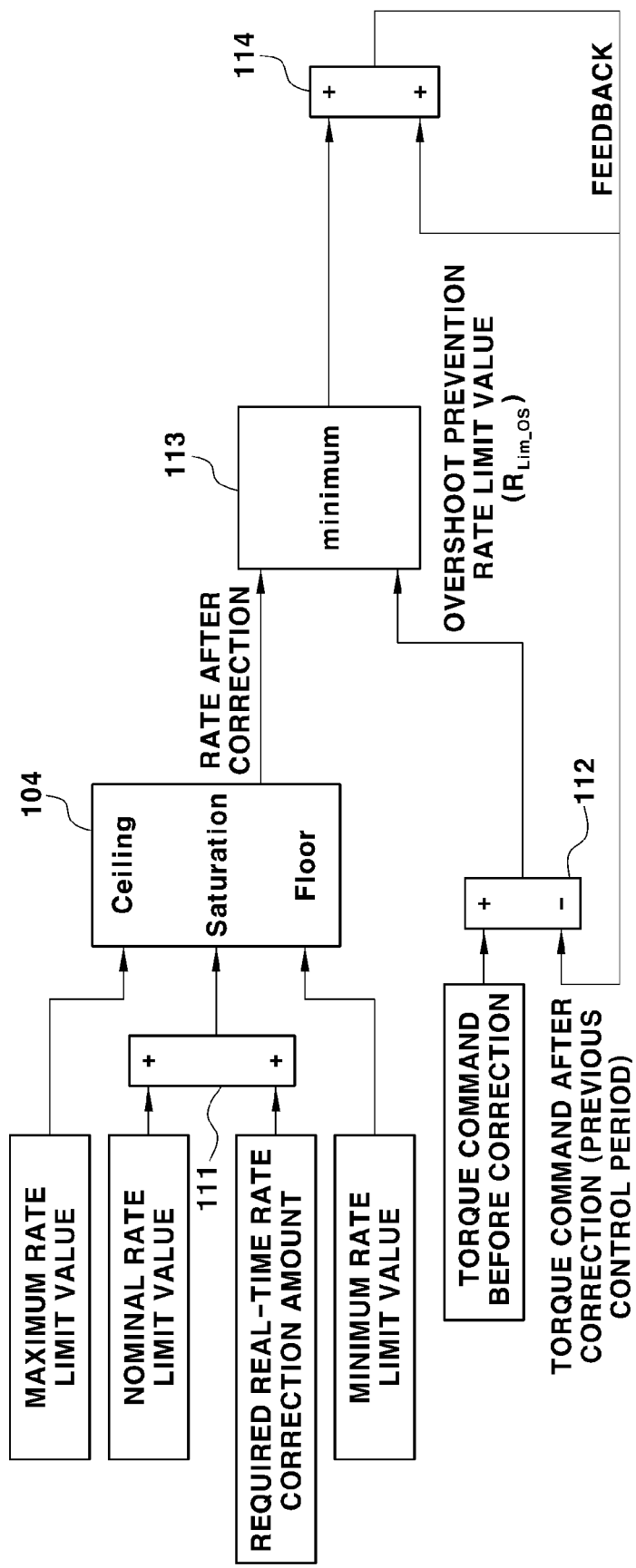
FIG. 12 is a view showing a torque command correction method according to a fifth exemplary embodiment of the present disclosure.

Further, FIG. 12 is a view showing a torque command correction method according to a fifth exemplary embodiment of the present disclosure. In the fifth exemplary embodiment, the maximum rate limit value and the minimum rate limit value are further used, compared to the first embodiment. Each of the maximum rate limit value and the minimum rate limit value may also be set to a scalar amount having no directivity and used.

In addition, each of the maximum rate limit value and the minimum rate limit value may be a preset constant or a value determined by setting data, such as a map or a function, from speed difference, driving system speed, or the torque command after correction TqC in the previous control period, in the same manner as the reverse rate limit value in each of the third exemplary embodiment and the fourth exemplary embodiment.

The fifth exemplary embodiment relates to a torque command correction method in the situation in which torque is increasing, in the same manner as in the first exemplary embodiment. When compared with the first exemplary embodiment of FIG. 4, a rate limit unit 104 is further provided between the rate correction unit 111 and the variation determination unit 113. At this time, the maximum rate limit value and the minimum rate limit value are input to the rate limit unit 104.

In the fifth exemplary embodiment, the maximum rate limit value may be set to a positive (+) value, which is a value having the same sign as the overshoot prevention rate limit value $R_{Lim\_OS}$, and the minimum rate limit value may be set to a negative (−) value, which is a value having a sign opposite the sign of the overshoot prevention rate limit value $R_{Lim\_OS}$.

In the fifth exemplary embodiment, a nominal rate limit value having a positive (+) value, which is a value having the same sign as the overshoot prevention rate limit value $R_{Lim\_OS}$, is input to the rate correction unit 111, in the same manner as in the first exemplary embodiment. With this, a required real-time rate correction amount, which may be a positive (+) value or a negative (−) value, is input to the rate correction unit 111. In the rate correction unit 111, the nominal rate limit value is corrected by the required real-time rate correction amount, and the corrected rate is input to the rate limit unit 104.

As a result, the final rate after correction output from the rate limit unit 104 is a value between the maximum rate limit value and the minimum rate limit value and is a value limited by the maximum rate limit value and the minimum rate limit value. At this time, the maximum rate limit value, which is a positive (+) value, is used as a ceiling value, and the minimum rate limit value, which is a negative (−) value, is used as a floor value.

The rate after correction output from the rate limit unit 104 is input to the variation determination unit 113, and the variation determination unit 113 may be configured to determine a smaller one of the overshoot prevention rate limit value and the rate after correction to be a torque command variation, in the same manner as in the first exemplary embodiment. In addition, the command correction unit 114 may be configured to sum the torque command after correction TqC in the previous control period, which has been fed back, and the torque command variation output from the variation determination unit 113, may be configured to determine the sum value to be a torque command after correction in the current control period, and output the torque command after correction in the current control period.

In the fifth exemplary embodiment described above, the minimum rate limit value and the maximum rate limit value are further used. In the methods described above, the maximum range of the rate after correction is limited by the nominal rate limit value or the overshoot prevention rate limit value. In contrast, in the fifth exemplary embodiment, the rate correction range is limited by the maximum rate limit value and the minimum rate limit value. At this time, the maximum rate limit value may designate the maximum range lower than the nominal rate limit value or the overshoot prevention rate limit value. In addition, the minimum rate limit value, which is a superordinate concept of the reverse rate limit value, may prevent rate retrogression and furthermore is used to limit the minimum rate.

Figure 13:
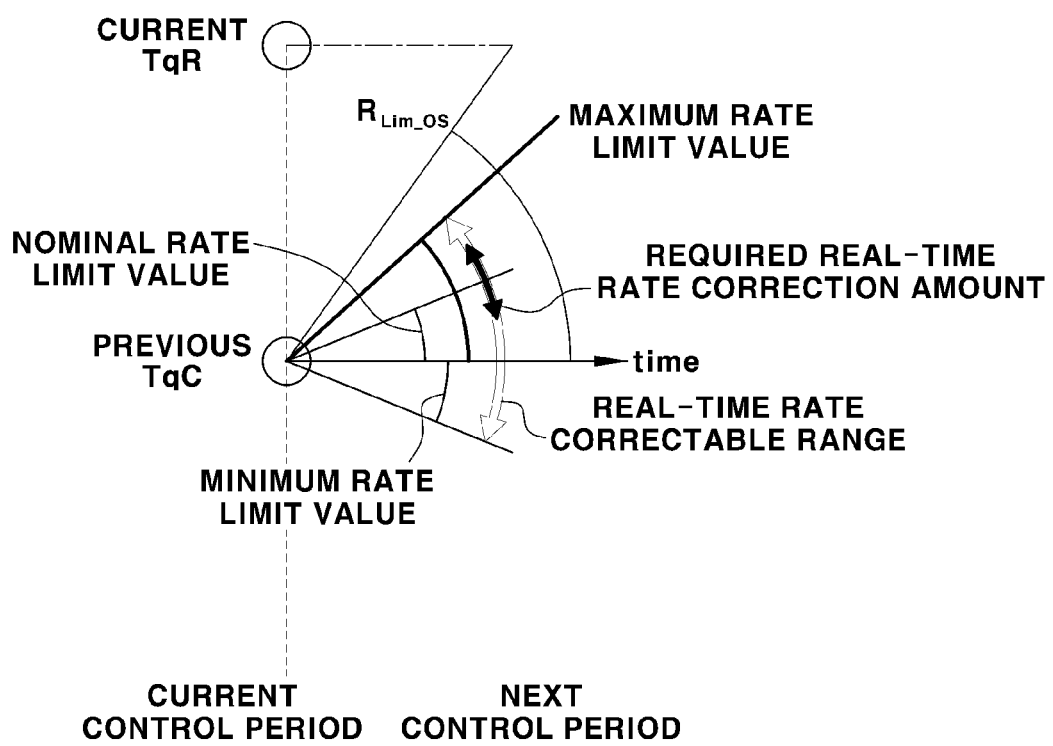
FIG. 13 is a view showing a real-time rate correctable range in the fifth exemplary embodiment of the present disclosure.

FIG. 13 is a view showing a real-time rate correctable range in the fifth exemplary embodiment of the present disclosure. In the fifth exemplary embodiment, the real-time rate correctable range is set to between the maximum rate limit value and the minimum rate limit value, unlike the first exemplary embodiment.

Figure 14:
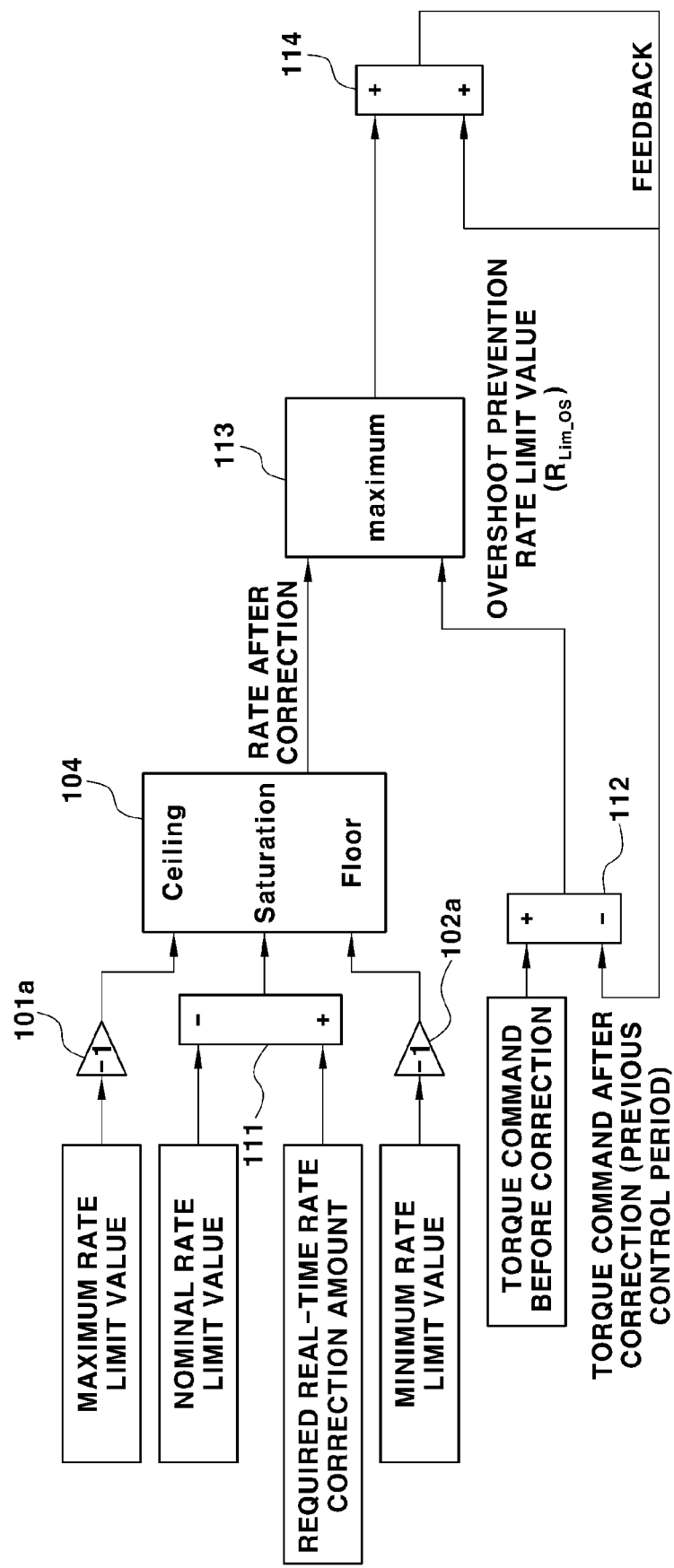
FIG. 14 is a view showing a torque command correction method according to a sixth exemplary embodiment of the present disclosure.

Further, FIG. 14 is a view showing a torque command correction method according to a sixth exemplary embodiment of the present disclosure. In the sixth exemplary embodiment, the maximum rate limit value and the minimum rate limit value are further used, compared to the second exemplary embodiment. Each of the maximum rate limit value and the minimum rate limit value of the sixth exemplary embodiment may also be set to a scalar amount having no directivity and used, in the same manner as in the fifth embodiment.

Additionally, in the sixth embodiment, each of the maximum rate limit value and the minimum rate limit value may be a preset constant or a value determined by setting data, such as a map or a function, from speed difference, driving system speed, or the torque command after correction TqC in the previous control period, in the same manner as in the fifth exemplary embodiment.

The sixth exemplary embodiment relates to a torque command correction method in the situation in which torque is decreasing, in the same manner as in the second exemplary embodiment. When compared with the second embodiment of FIG. 6, a rate limit unit 104 is further provided between the rate correction unit 111 and the variation determination unit 113. At this time, the maximum rate limit value and the minimum rate limit value having the signs changed respectively by the first conversion unit and the second conversion unit are input to the rate limit unit 104.

In the sixth exemplary embodiment, the overshoot prevention rate limit value $R_{Lim\_OS}$ may be a negative (−) value, and the maximum rate limit value may be set to a positive (+) value, in the same manner as in the fifth embodiment. In addition, the minimum rate limit value may be set to a negative (−) value, in the same manner as in the fifth embodiment.

In the sixth exemplary embodiment, a nominal rate limit value having a positive (+) value, which is a value having the same sign as the overshoot prevention rate limit value $R_{Lim\_OS}$, may be input to the rate correction unit 111, in the same manner as in the second embodiment. With this, a required real-time rate correction amount, which may be a positive (+) value or a negative (−) value, is input. In the rate correction unit 111, the sign of the nominal rate limit value is converted, the nominal rate limit value having the converted sign is corrected by the required real-time rate correction amount, and the corrected rate is input to the rate limit unit 104. Referring to FIG. 14, it may be seen that the rate correction unit 111 sums the nominal rate limit value having the changed sign and the required real-time rate correction amount for rate correction, in the same manner as in the second embodiment.

As a result, the minimum rate limit value having the sign changed from negative (−) to positive (+) by a first conversion unit 101a, the maximum rate limit value having the sign changed from positive (+) to negative (−) by a second conversion unit 102a, and a rate obtained by correcting the nominal rate limit value by the required real-time rate correction amount by the rate correction unit 111 are input to the rate limit unit 104. When the maximum rate limit value is a value having a sign opposite the sign of the overshoot prevention rate limit value $R_{Lim\_OS}$, as described above, the maximum rate limit value is multiplied by −1 to change the sign of the maximum rate limit value. When the minimum rate limit value is a value having the same sign as the overshoot prevention rate limit value $R_{Lim\_OS}$, the minimum rate limit value is multiplied by −1 to change the sign of the minimum rate limit value.

As a result, the final rate after correction output from the rate limit unit 104 is a value between the maximum rate limit value and the minimum rate limit value and is a value limited by the maximum rate limit value and the minimum rate limit value. At this time, the minimum rate limit value having a sign changed to a positive (+) value is used as a ceiling value, and the maximum rate limit value having a sign changed to a negative (−) value is used as a floor value.

The rate after correction output from the rate limit unit 104 is input to the variation determination unit 113, and the variation determination unit 113 may be configured to determine a larger one of the overshoot prevention rate limit value and the rate after correction to be a torque command variation, in the same manner as in the second exemplary embodiment. In addition, the command correction unit 114 may be configured to sum the torque command after correction TqC in the previous control period, which has been fed back, and the torque command variation output from the variation determination unit 113, may be configured to determine the sum value to be a torque command after correction in the current control period, and output the torque command after correction in the current control period.

In the sixth exemplary embodiment described above, the minimum rate limit value and the maximum rate limit value are further used, and the rate correction range is limited by the minimum rate limit value having the changed sign and the maximum rate limit value having the changed sign. Even though the required real-time rate correction amount corrects the nominal rate limit value, therefore, the corrected rate cannot deviate from a correctable range set by the minimum rate limit value and the maximum rate limit value.

Figure 15:
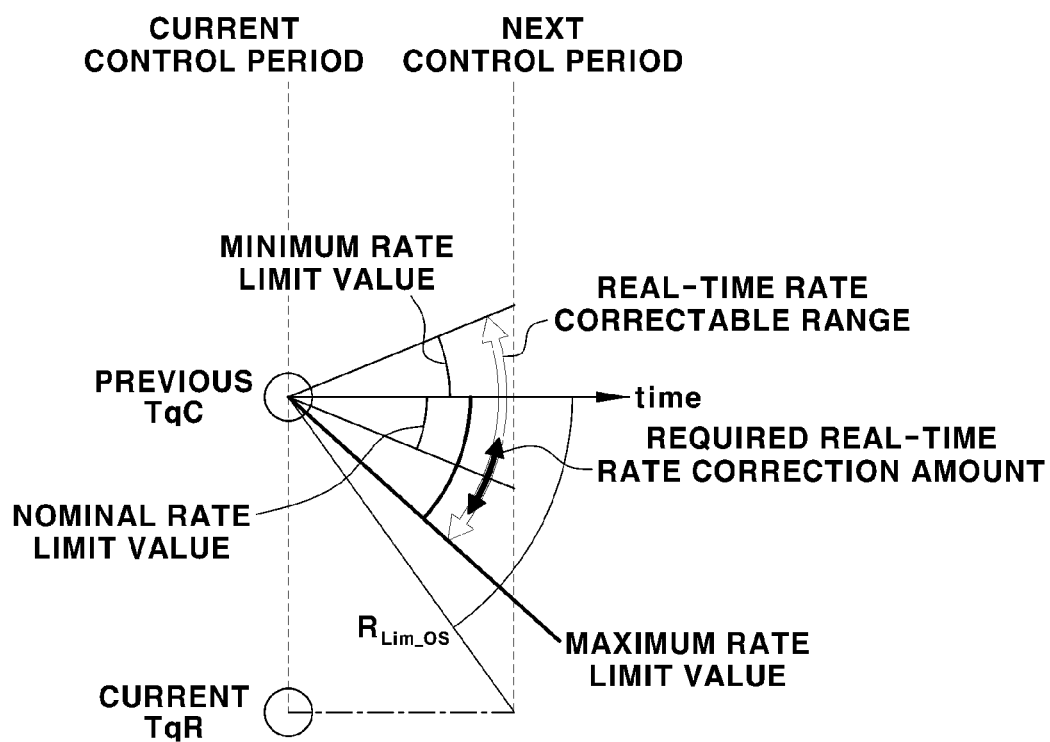
FIG. 15 is a view showing a real-time rate correctable range in the sixth exemplary embodiment of the present disclosure.

FIG. 15 is a view showing a real-time rate correctable range in the sixth exemplary embodiment of the present disclosure. In the sixth exemplary embodiment, the real-time rate correctable range is set to between the maximum rate limit value and the minimum rate limit value, unlike the second exemplary embodiment.

In brief, in the fifth exemplary embodiment and the sixth exemplary embodiment, a rate capable of best preventing the torque command convergence state TqC=TqR is selected from between the overshoot prevention rate limit value $R_{Lim\_OS}$ and the rate after correction and used as the corrected rate and variation of the torque command. However, the rate after correction cannot be set to a value deviating from the correctable range set by the minimum rate limit value and the maximum rate limit value.

As is apparent from the foregoing, a method of adjusting torque of a vehicle driving device according to the present disclosure is capable of securing reactivity to driver input (accelerator and brake pedal manipulation) and inhibiting occurrence of noise, vibration, and harshness (NVH) due to abrupt change of torque (driving force).

In addition, according to the present disclosure, it may be possible to solve the trouble of setting a torque command filter or rate for each situation in consideration of many factors and to generate the optimum torque command suitable for the state of a vehicle in real time. Furthermore, according to the present disclosure, a method of setting a real-time automatic adjustment range of a torque rate is provided, whereby it may be possible to prevent a possibility of vibration generation due to torque divergence without one-by –one tests, and therefore improvement in development efficiency may also be expected.

Additionally, in the present disclosure, a reverse rate limit value is set to a negative (−) value. Even after a torque command after correction converges on a torque command before correction, therefore, it may be possible to correct the torque command according to a need for real-time backlash correction. Consequently, it may be possible to realize a function of sensing fine gear noise due to backlash and reducing the torque command by an appropriate amount, whereby an additional NVH inhibition effect can be expected.

Above all, according to the present disclosure, the above effects may be realized through control logic alone, without change of hardware, whereby it may be possible to provide an effective method of improving vehicle marketability without increase in cost.

It will be apparent to a person of ordinary skill in the art that the present disclosure described above is not limited to the above exemplary embodiments and the accompanying drawings and that various substitutions, modifications, and variations can be made without departing from the technical idea of the present disclosure.

What is claimed is:

1. A method of controlling torque of a vehicle driving device, comprising:
   estimating, by a controller, speed of an engine or a motor of a vehicle from vehicle driving information collected from the vehicle and calculating speed difference value between actually measured speed of the engine or the motor and the estimated speed of the engine or the motor;
   wherein the speed difference is calculated between the actually measured speed of the engine or the motor and the estimated speed of the engine or the motor in which twisting and backlash are removed;
   determining, by the controller, a nominal rate limit value according to the vehicle driving information;
   determining, by the controller, a required real-time rate correction amount according to the calculated speed difference;
   determining, by the controller, a torque command variation based on the determined nominal rate limit value and the determined required real-time rate correction amount; and
   after a correction in a previous control period, correcting, by the controller, a torque command in a current control period with the determined torque command variation which then enables another torque command to be determined after the correction in the current control period.

2. The method according to claim 1, wherein the determining of a torque command variation includes:
   determining a rate after correction using the determined nominal rate limit value and the determined required real-time rate correction amount;
   determining an overshoot prevention rate limit value, which is a difference value between a torque command before correction in a current control period determined from the vehicle driving information and a torque command after correction in a previous control period; and
   determining a torque command variation based on the determined rate after correction and the determined overshoot prevention rate limit value.

3. The method according to claim 2, wherein, in the determining of the rate after correction, the rate after correction is determined to be a value obtained by multiplying the determined nominal rate limit value by a scale factor determined to be a value corresponding to the required real-time rate correction amount.

4. The method according to claim 2, wherein the overshoot prevention rate limit value is determined to be a value obtained by subtracting the torque command after correction in the previous control period from the torque command before correction in the current control period.

5. The method according to claim 4, wherein
   when the overshoot prevention rate limit value is determined to be a positive (+) value and the nominal rate limit value is determined to be a positive (+) value, a value obtained by summing the nominal rate limit value and the required real-time rate correction amount is determined to be a rate after correction, and a smaller one of the rate after correction and the overshoot prevention rate limit value is determined to be a torque command variation.

6. The method according to claim 4, wherein when the overshoot prevention rate limit value is determined to be a negative (−) value and the nominal rate limit value is determined to be a positive (+) value, the nominal rate limit value is multiplied by −1 to change the nominal rate limit value to a negative (−) value, a value obtained by summing the nominal rate limit value changed to the negative (−) value and the required real-time rate correction amount is determined to be a rate after correction, and a larger one of the rate after correction and the overshoot prevention rate limit value is determined to be a torque command variation.

7. The method according to claim 4, wherein both the overshoot prevention rate limit value and the nominal rate limit value, each of which is one of a positive (+) value and a negative (−) value, are determined to be identical positive (+) or negative (−) values, and a value obtained by summing the nominal rate limit value and the required real-time rate correction amount is determined to be a rate after correction.

8. The method according to claim 7, wherein
when the overshoot prevention rate limit value is a positive (+) value, a smaller one of the rate after correction and the overshoot prevention rate limit value is determined to be a torque command variation, and
when the overshoot prevention rate limit value is a negative (−) value, a larger one of the rate after correction and the overshoot prevention rate limit value is determined to be a torque command variation.

9. The method according to claim 7, wherein
when the overshoot prevention rate limit value is a positive (+) value, a minimum one of the rate after correction, the nominal rate limit value, and the overshoot prevention rate limit value is determined to be a torque command variation, and
when the overshoot prevention rate limit value is a negative (−) value, a maximum one of the rate after correction, the nominal rate limit value, and the overshoot prevention rate limit value is determined to be a torque command variation.

10. The method according to claim 4, wherein
the overshoot prevention rate limit value and the nominal rate limit value are determined to be values having opposite signs, each of which is one of a positive (+) value and a negative (−) value, and
the nominal rate limit value is multiplied by −1 to reverse the sign of the nominal rate limit value, and a value obtained by summing the nominal rate limit value having the changed sign and the required real-time rate correction amount is determined to be a rate after correction.

11. The method according to claim 10, wherein
when the overshoot prevention rate limit value is a positive (+) value, a smaller one of the rate after correction and the overshoot prevention rate limit value is determined to be a torque command variation, and
when the overshoot prevention rate limit value is a negative (−) value, a larger one of the rate after correction and the overshoot prevention rate limit value is determined to be a torque command variation.

12. The method according to claim 10, wherein
when the overshoot prevention rate limit value is a positive (+) value, a minimum one of the rate after correction, the nominal rate limit value, and the overshoot prevention rate limit value is determined to be a torque command variation, and
when the overshoot prevention rate limit value is a negative (−) value, a maximum one of the rate after correction, the nominal rate limit value, and the overshoot prevention rate limit value is determined to be a torque command variation.

13. The method according to claim 2, wherein the determining of a rate after correction includes:
determining a rate obtained by correcting the determined nominal rate limit value by the required real-time rate correction amount; and
determining the rate after correction obtained by limiting the rate corrected by the required real-time rate correction amount based on a reverse rate limit value.

14. The method according to claim 13, wherein
when both the overshoot prevention rate limit value and the reverse rate limit value, each of which is one of a positive (+) value and a negative (−) value, are identical positive (+) or negative (−) values, the reverse rate limit value is multiplied by −1 to reverse the sign of the reverse rate limit value, and
the reverse rate limit value having the changed sign is used in limiting the rate corrected by the required real-time rate correction amount.

15. The method according to claim 2, wherein the determining of a rate after correction includes:
determining a rate obtained by correcting the determined nominal rate limit value by the required real-time rate correction amount; and
determining the rate after correction obtained by limiting the rate corrected by the required real-time rate correction amount to a value between a set maximum rate limit value and a set minimum rate limit value.

16. The method according to claim 15, wherein
when the overshoot prevention rate limit value and the maximum rate limit value are values having opposite signs, each of which is one of a positive (+) value and a negative (−) value, the maximum rate limit value is multiplied by −1 to reverse the sign of the maximum rate limit value,
when both the overshoot prevention rate limit value and the minimum rate limit value are values having same signs, each of which is one of a positive (+) value and a negative (−) value, the minimum rate limit value is multiplied by −1 to reverse the sign of the minimum rate limit value, and
the rate after correction limited to a value between the maximum rate limit value having the changed sign and the minimum rate limit value having the changed sign is determined.

17. The method according to claim 1, wherein
the estimating of the speed of the engine or the motor of the vehicle from the collected vehicle driving information in the calculating of speed difference includes:
outputting, by a feedback calculation unit of the controller, a feedback control value using speed difference between current measured speed of the engine or the motor and estimated speed in a previous control period as input;
determining and outputting, by a feedforward calculation unit of the controller, torque of the engine or the motor from the vehicle driving information;
summing the output value of the feedback calculation unit and the output value of the feedforward calculation unit and converting a sum value into angular acceleration of the engine or the motor using an inertia correction coefficient; and
obtaining estimated speed of the engine or the motor from angular speed of the engine or the motor obtained by integrating the converted angular acceleration of the engine or the motor and rate information of a reference torque command.

18. The method according to claim 17, wherein the feedback calculation unit includes:
- a P controller and an I controller each having the speed difference between the current measured speed of the engine or the motor and the estimated speed in the previous control period as input; and
- a first summation unit configured to sum an output value of the P controller and an output value of the I controller and to output a sum value as the feedback control value.

19. The method according to claim 17, wherein the feedforward calculation unit includes:
- an acceleration model unit configured to apply a correction coefficient to the reference torque command, which is a driving torque command, to determine and output a driving torque value;
- a braking model unit configured to apply a correction coefficient to a braking torque command to determine and output a braking torque value; and
- a second summation unit configured to sum an output value of the acceleration model unit and an output value of the braking model unit and to output a sum value as the torque of the engine or the motor.

20. The method according to claim 17, wherein, in the obtaining of the estimated speed of the engine or the motor, a variation of the reference torque command is corrected by a correction coefficient and is summed with the angular speed of the engine or the motor to obtain the estimated speed of the engine or the motor.

* * * * *